(12) United States Patent
Nishikawa

(10) Patent No.: US 8,906,538 B2
(45) Date of Patent: Dec. 9, 2014

(54) SEPARATOR FOR NON-AQUEOUS SECONDARY BATTERY, PROCESS FOR PRODUCING THE SAME, AND NON-AQUEOUS SECONDARY BATTERY

(75) Inventor: Satoshi Nishikawa, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/046,913

(22) Filed: Mar. 14, 2011

(65) Prior Publication Data

US 2011/0165469 A1 Jul. 7, 2011

Related U.S. Application Data

(62) Division of application No. 12/513,964, filed as application No. PCT/JP2007/072279 on Nov. 16, 2007.

(30) Foreign Application Priority Data

Nov. 20, 2006 (JP) ................. 2006-312978
Nov. 20, 2006 (JP) ................. 2006-312979

(51) Int. Cl.
*H01M 2/16* (2006.01)
*B05D 5/12* (2006.01)
*H01M 2/14* (2006.01)
*H01M 10/42* (2006.01)
*H01M 10/0525* (2010.01)
*H01M 10/052* (2010.01)

(52) U.S. Cl.
CPC .......... *H01M 2/1653* (2013.01); *H01M 2/1646* (2013.01); *H01M 2/145* (2013.01); *H01M 2/166* (2013.01); *H01M 10/4235* (2013.01); *H01M 10/0525* (2013.01); *H01M 2/1686* (2013.01); *H01M 10/052* (2013.01)
USPC .......................................... 429/129; 427/58

(58) Field of Classification Search
CPC . H01M 10/4235; H01M 2/145; H01M 2/166; H01M 2/1646
USPC ....................................................... 429/129
See application file for complete search history.

(56) References Cited

U.S. PATENT DOCUMENTS

| | | | |
|---|---|---|---|
| 6,447,958 B1 | 9/2002 | Shinohara et al. | |
| 2001/0036580 A1 | 11/2001 | Wataru et al. | |
| 2004/0161598 A1 | 8/2004 | Ohno et al. | |
| 2005/0214637 A1 | 9/2005 | Imachi et al. | |
| 2006/0019154 A1 | 1/2006 | Imachi et al. | |
| 2006/0286445 A1 | 12/2006 | Nishino et al. | |
| 2008/0070107 A1 | 3/2008 | Kasamatsu et al. | |

FOREIGN PATENT DOCUMENTS

| | | |
|---|---|---|
| CN | 16777715 A | 10/2005 |
| EP | 1 233 036 A1 | 8/2002 |
| JP | 1012211 A | 1/1998 |
| JP | 2000030686 A | 1/2000 |
| JP | 2001-023600 A | 1/2001 |
| JP | 2002151044 A | 5/2002 |
| JP | 2002355938 A | 12/2002 |
| JP | 2004363048 A | 12/2004 |
| JP | 2005-228514 A | 8/2005 |
| JP | 2005209570 A | 8/2005 |
| JP | 2005-285385 A | 10/2005 |
| JP | 2006-032246 A | 2/2006 |
| JP | 2006289657 A | 10/2006 |
| JP | 2007-125821 A | 5/2007 |
| JP | 2007227361 A | 9/2007 |
| JP | 2007273123 A | 10/2007 |
| JP | 2007324073 A | 12/2007 |
| TW | 595035 B | 6/2004 |
| WO | 01/19906 A1 | 3/2001 |
| WO | 2006/061936 A | 6/2006 |

OTHER PUBLICATIONS

Korean Office Action in Application No. 10-2010-7008665 dated Jul. 29, 2011.

*Primary Examiner* — Patrick Ryan
*Assistant Examiner* — Ladan Mohaddes
(74) *Attorney, Agent, or Firm* — Sughrue Mion, PLLC

(57) ABSTRACT

A first object of the present invention is to provide a separator including a polyethylene microporous membrane and a heat-resistant porous layer, and that has a sufficient shutdown function and a sufficient heat resistance, and can be formed with a reduced thickness and can overcome the problem of slidability. A first aspect of the present invention is a separator for a non-aqueous secondary battery. The separator includes a microporous membrane of primarily polyethylene, and a heat-resistant porous layer of a primarily heat-resistant polymer formed on at least one surface of the microporous membrane. (1) The microporous membrane has a Gurley number of 25 to 35 sec/100 cc·μm per unit thickness. (2) The heat-resistant porous layer contains inorganic fine particles having an average particle diameter of 0.1 to 1.0 μm. (3) The inorganic fine particles are 40% to 80% in volume with respect to a total volume of the heat-resistant polymer and the inorganic fine particles. (4) The heat-resistant porous layer has a total thickness of 3 to 12 μm.

15 Claims, 2 Drawing Sheets

SEPARATOR FOR NON-AQUEOUS SECONDARY BATTERY, PROCESS FOR PRODUCING THE SAME, AND NON-AQUEOUS SECONDARY BATTERY

CROSS REFERENCE TO RELATED APPLICATIONS

This is a divisional of application Ser. No. 12/513,964 filed May 7, 2009, which is the National Stage of PCT/JP2007/072279 filed Nov. 16, 2007, the disclosures of which are incorporated by reference.

TECHNICAL FIELD

The present invention relates to a separator for a non-aqueous secondary battery, and specifically to a separator intended to improve safety of non-aqueous secondary batteries.

BACKGROUND ART

A non-aqueous secondary battery as represented by a lithium-ion secondary battery has been pervasive as the main power supply of portable electronic devices, for example, such as cellular phones and laptop computers. The lithium-ion secondary battery has been the subject of ongoing development to obtain higher energy density, higher capacity, and higher output. This trend is expected to increase in the future. To meet such demands, it is of great importance to provide a technique that ensures high battery safety.

The separator for lithium-ion secondary batteries generally uses a microporous membrane made from polyethylene or polypropylene. The separator has a function known as a shutdown function, intended to provide safety for the lithium-ion secondary battery. The shutdown function refers to the separator's ability to abruptly increase resistance when the battery temperature rises to a certain temperature. With the shutdown function, the separator shuts down the current flow when there is unexpected heat generation in the battery, preventing further temperature increase in the battery, and thereby avoiding fuming, fire, or explosion. The operating principle of the shutdown function is the closure of the pores in the separator, which occurs as the material of the separator melts and deforms. In the case of a separator made from polyethylene, the shutdown function comes into operation at a temperature of approximately 140° C., near the melting point of polyethylene. The shutdown temperature is approximately 165° C. for polypropylene separators. Because a relatively low shutdown temperature is preferred from the standpoint of ensuring battery safety, polyethylene is more commonly used for the separator.

In addition to the shutdown function, a sufficient heat resistance is required for the separator of the lithium-ion secondary battery. This is for the following reason. In conventional separators solely made from polyethylene or other microporous membranes, the separator continues to melt (known as "meltdown") as the battery remains exposed to the operating temperatures of the shutdown function after the shutdown. This is the intrinsic characteristic of the shutdown function which operates according to the foregoing principle. The meltdown creates a short circuit inside the battery, and generates a large amount of heat, exposing the battery to the risk of fuming, fire, and explosion. The separator therefore requires, in addition to the shutdown function, a heat resistance sufficient to prevent meltdown near the operating temperatures of the shutdown function.

In an attempt to provide both the shutdown function and the heat resistance for the separator, there have been proposed separators that include a polyethylene microporous membrane coated with a porous layer made from a heat-resistant resin such as polyimide or aromatic polyamide (see, for example, Patent Documents 1 to 5). In these separators, the shutdown function comes into operation near the melting point of polyethylene (about 140° C.), and, because the heat-resistant porous layer has sufficient heat resistance, meltdown does not occur even at temperatures of 200° C. and higher. However, in this type of conventional separators, because the thickness of the polyethylene microporous membrane is as thick as about 20 µm in virtually all separators, the separator thickness exceeds 20 µm when coated with the heat-resistant porous layer. A drawback of the separators of the type provided with the heat-resistant porous layer, then, is the thickness that exceeds the thickness of about 20 µm commonly adopted by the separators currently available in the market (those solely made from polyethylene or other microporous membranes).

The shutdown function limits the thickness of the separators of the type including the heat-resistant porous layer. Specifically, because of the correlation between the shutdown function and the thickness of the polyethylene microporous membrane, the shutdown function becomes reduced when the thickness of the polyethylene microporous membrane is reduced. Further, the shutdown function tends to be reduced when the polyethylene microporous membrane is coated with the heat-resistant porous layer, compared with using the polyethylene microporous membrane alone. For these reasons, it has been required conventionally to provide a thickness of at least 20 µm for the polyethylene microporous membrane, in order to provide a sufficient shutdown function for the separator. Patent Document 3 describes as an example a polyethylene microporous membrane having a thickness of 4 µm. However, the publication does not disclose anything about the shutdown function. Usually, a sufficient shutdown function cannot be obtained when the thickness of the polyethylene microporous membrane is as small as 4 µm as in this example.

One way to reduce the separator thickness is to reduce the thickness of the heat-resistant porous layer. However, when the thickness of the heat-resistant porous layer is reduced too much, the heat resistance will be insufficient, and heat shrinkage occurs over the entire separator in a temperature range including and above the melting point of polyethylene. In this connection, Patent Document 4 teaches a configuration in which a porous layer that contains a heat resistant nitrogen-containing aromatic polymer and a ceramic powder are formed on a polyethylene microporous membrane to improve the heat resistance of the heat-resistant porous layer. This technique appears to successfully reduce the thickness of the heat-resistant porous layer without failing to provide a sufficient heat resistance. However, Patent Document 4 does not address the heat shrinkage issue of the separator, and as such a battery using the separator of Patent Document 4 has a possibility of heat shrinkage under high temperature.

As described above, concerning the separator including the polyethylene microporous membrane and the heat-resistant porous layer, no technique is available that can sufficiently cope with both the shutdown function and heat resistance issues, and, at the same time, provide a way to reduce the thickness of the separator.

From the standpoint of manufacture efficiency, there is also a need for a technique to improve the slidability of the separator provided with the heat-resistant porous layer. Specifically, battery manufacture employs a step in which a core is drawn out of the electronic element produced by winding the separator and electrodes around the core. Generally, stainless steel or other metallic material, with or without a thin ceramic coating, is used as the core. In winding, the separator is first wound around the core before the electrodes. The heat-resistant resin such as a wholly aromatic polyamide used for the heat-resistant porous layer of the separator is very adherent to the metallic material or ceramic material. The adhesion between the core and the separator causes a problem when drawing out the core from the electronic element, as it may damage the electronic element being produced.

Another challenge, then, is to improve the slidability of the separator provided with the heat-resistant porous layer. This issue becomes even more problematic in separators including the heat-resistant porous layer on the both surfaces of the polyethylene microporous membrane, because, in such separators, the heat-resistant porous layer will always be in contact with the core. The problem remains also in separators including the heat-resistant porous layer only on one surface of the polyethylene microporous membrane, because it undesirably imposes limitations on the orientation of the element, requiring the core to contact the side not provided with the heat-resistant porous layer.

The slidability issue is not addressed in the Prior Art section of Patent Document 4 or other publications. Patent Document 5 does address the slidability issue. To overcome the slidability problem, Patent Document 5 proposes a technique to form an additional spacer layer on a wholly aromatic polyamide porous layer. However, the configuration forming the spacer layer is not desirable because it involves large numbers of steps and is complex.

Patent Document 1: JP-A-2002-355938
Patent Document 2: JP-A-2005-209570
Patent Document 3: JP-A-2005-285385
Patent Document 4: JP-A-2000-030686
Patent Document 5: JP-A-2002-151044

DISCLOSURE OF THE INVENTION

Problems that the Invention is to Solve

Against the foregoing background, it is a first object of the present invention to provide a separator including a polyethylene microporous membrane and a heat-resistant porous layer, and that has a sufficient shutdown function and sufficient heat resistance, and can be formed with a reduced thickness and can overcome the problem of slidability. Further, the first object is to provide a process for producing such separators, and a non-aqueous secondary battery using the separator.

In another aspect, a second object of the present invention is to provide a separator including a polyethylene microporous membrane and a heat-resistant porous layer, and that can sufficiently cope with both the shutdown function and heat resistance issues, and can be formed with a reduced thickness. Further, the second object is to provide a non-aqueous secondary battery using the separator.

Means for Solving the Problems

In order to achieve the foregoing first object, a first aspect of the present invention provides the following:

1. A separator for a non-aqueous secondary battery, including: a microporous membrane of primarily polyethylene; and a heat-resistant porous layer of primarily at least one kind of heat-resistant polymer selected from the group consisting of a wholly aromatic polyamide, a polyimide, a polyamide-imide, a polysulfone, and a polyether sulfone, the heat-resistant porous layer being formed on at least one surface of the microporous membrane, the separator characterized in that:

(1) the microporous membrane has a Gurley number of 25 to 35 sec/100 cc·µm per unit thickness;

(2) the heat-resistant porous layer contains inorganic fine particles having an average particle diameter of 0.1 to 1.0 µm;

(3) the inorganic fine particles are 40% to 80% in volume with respect to a total volume of the heat-resistant polymer and the inorganic fine particles; and (4) the heat-resistant porous layer has a total thickness of 3 to 12 µm when formed on both surfaces of the microporous membrane, and a thickness of 3 to 12 µm when formed on only one surface of the microporous membrane.

2. The separator according to 1, wherein the heat-resistant porous layer is formed on the both surfaces of the microporous membrane.

3. The separator according to 1 or 2, wherein the heat-resistant polymer is a wholly aromatic polyamide.

4. The separator according to 3, wherein the wholly aromatic polyamide is a meta-type wholly aromatic polyamide.

5. The separator according to 1, wherein the heat-resistant porous layer is formed on the both surfaces of the microporous membrane, wherein the microporous membrane is formed of polyethylene, and wherein the heat-resistant polymer is a meta-type wholly aromatic polyamide.

6. The separator according to 4 or 5, wherein the meta-type wholly aromatic polyamide is a poly-m-phenyleneisophthalamide.

7. The separator according to any one of 1 through 6, wherein the inorganic fine particles are made of alumina, and wherein the inorganic fine particles are 65% to 90% in weight with respect to a total weight of the heat-resistant polymer and the inorganic fine particles.

8. The separator according to 7, wherein the inorganic fine particles are made of α-alumina.

9. The separator according to any one of 1 through 8, wherein the microporous membrane has a penetration strength of 250 g or more.

10. The separator according to any one of 1 through 9, wherein the microporous membrane has a thickness of 7 to 16 µm, and wherein the separator has a thickness of 20 µm or less as a whole.

11. A producing process of a separator for a non-aqueous secondary battery, the separator including a microporous membrane of primarily polyethylene, and a heat-resistant porous layer of a primarily wholly aromatic polyamide formed on at least one surface of the microporous membrane, the process characterized by including:

(1) applying a coating liquid to at least one surface of the microporous membrane, the coating liquid including a wholly aromatic polyamide, inorganic fine particles, a solvent for dissolving the wholly aromatic polyamide, and a solvent that serves as a poor solvent for the wholly aromatic polyamide;

(2) solidifying the coating liquid by immersing the microporous membrane in a mixture of the solvent for dissolving the wholly aromatic polyamide, and the solvent that serves as a poor solvent for the wholly aromatic polyamide, after applying the coating liquid to the microporous membrane;

(3) performing water washing to remove the solvent mixture; and (4) performing drying to remove the water.

12. The process according to 11, wherein the coating liquid is a slurry in which the wholly aromatic polyamide is dissolved, and in which the inorganic fine particles are dispersed.

13. The process according to 12, wherein the wholly aromatic polyamide is a meta-type wholly aromatic polyamide.

14. A non-aqueous secondary battery using a separator of any one of 1 through 10.

Further, as a result of studies on the second object, the inventor of the present invention found that both the shutdown function and heat resistance requirements can be satisfied even with a microporous membrane sufficiently thinner than conventional microporous membranes, when a microporous membrane of primarily polyethylene, and a heat-resistant porous layer are combined under specific conditions. A second aspect of the present invention was completed upon this finding. Specifically, in order to achieve the foregoing second object, the second aspect of the present invention provides the following:

15. A separator for a non-aqueous secondary battery, including: a microporous membrane of primarily polyethylene; and a heat-resistant porous layer of primarily at least one kind of heat-resistant polymer selected from the group consisting of a wholly aromatic polyamide, a polyimide, a polyamide-imide, a polysulfone, and a polyether sulfone, the heat-resistant porous layer being formed on at least one surface of the microporous membrane, the separator characterized in that:

(1) the microporous membrane has a Gurley number of 25 to 35 sec/100 cc·μm per unit thickness;

(2) the microporous membrane has a thickness of 7 to 16 μm;

(3) the heat-resistant polymer is coated in an amount of 2 to 3 g/m$^2$;

(4) the heat-resistant porous layer has a total thickness of 3 to 7 μm when formed on both surfaces of the microporous membrane, and a thickness of 3 to 7 μm when formed on only one surface of the microporous membrane; and (5) the heat-resistant porous layer has a porosity of 40% to 60%.

16. The separator according to 15, wherein the microporous membrane has a heat shrinkage rate at 105° C. of 10% or less both in a MD direction and a TD direction.

17. The separator according to 15 or 16, wherein the microporous membrane has a penetration strength of 250 g or more.

18. The separator according to any one of 15 through 17, wherein the heat-resistant porous layer is formed on the both surfaces of the microporous membrane, wherein the microporous membrane is formed of polyethylene, and wherein the heat-resistant polymer is a meta-type wholly aromatic polyamide.

19. The separator according to 18, wherein the meta-type wholly aromatic polyamide is a poly-m-phenyleneisophthalamide.

20. A non-aqueous secondary battery using a separator of any one of 15 through 19.

Advantage of the Invention

A separator of the present invention improves safety of non-aqueous secondary batteries. The separator therefore finds optimum use in a high-energy-density, high-capacity, or high-output-density non-aqueous secondary battery.

BEST MODE FOR CARRYING OUT THE INVENTION

First Aspect of the Invention

Figure 1:
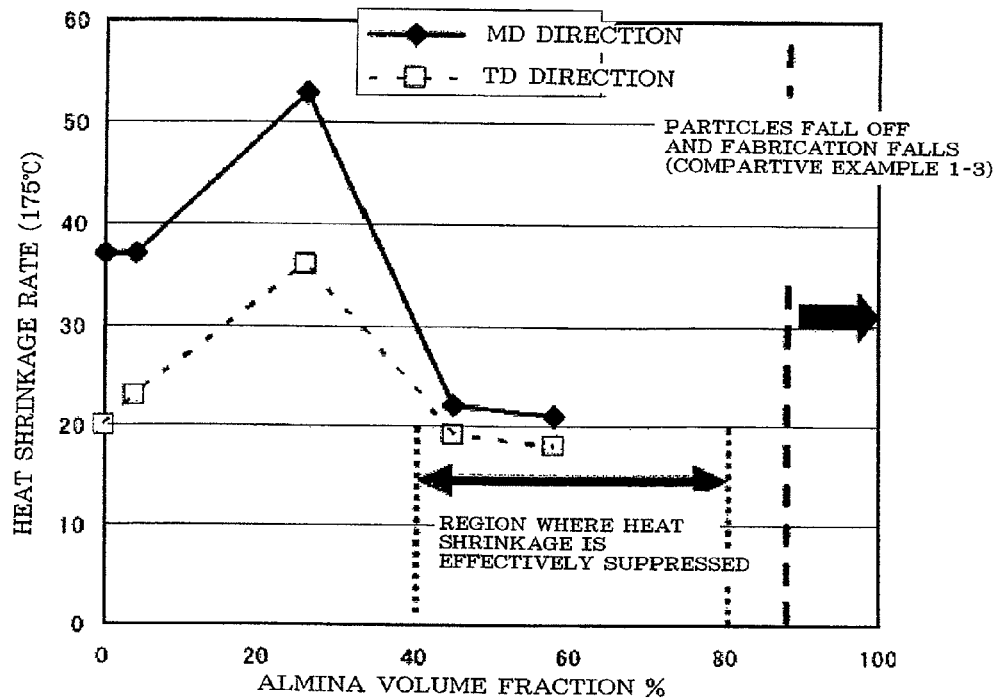
FIG. 1 is a graph concerning an example according to the first aspect of the present invention, representing a relationship between heat shrinkage rate and the amount of inorganic fine particles added.

The first aspect of the present invention is described below in detail.

[A Separator for a Non-Aqueous Secondary Battery]

The first aspect of the present invention is a separator for a non-aqueous secondary battery, the separator including:

a microporous membrane of primarily polyethylene; and a heat-resistant porous layer of primarily at least one kind of heat-resistant polymer selected from the group consisting of a wholly aromatic polyamide, a polyimide, a polyamide-imide, a polysulfone, and a polyether sulfone, the heat-resistant porous layer being formed on at least one surface of the microporous membrane, the separator characterized in that:

(1) the microporous membrane has a Gurley number of 25 to 35 sec/100 cc·μm per unit thickness;

(2) the heat-resistant porous layer contains inorganic fine particles having an average particle diameter of 0.1 to 1.0 μm;

(3) the inorganic fine particles are 40% to 80% in volume with respect to a total volume of the heat-resistant polymer and the inorganic fine particles; and (4) the heat-resistant porous layer has a total thickness of 3 to 12 μm when formed on both surfaces of the microporous membrane, and a thickness of 3 to 12 μm when formed on only one surface of the microporous membrane.

By satisfying the foregoing conditions (1) to (4) at the same time, the separator can exhibit desirable shutdown characteristics, effectively prevent heat shrinkage at high temperatures, and can be formed with a reduced thickness. It is also possible to overcome the slidability problem of the heat-resistant porous layer.

A separator for a non-aqueous secondary battery according to the first aspect of the present invention preferably has a thickness about the same as or less than the thicknesses of conventional separators. A thickness of 20 μm or less is preferable to meet the demands for a thin separator.

Preferably, the separator, as a whole, has a Gurley number of 200 to 1,000 sec/100 cc, more preferably 250 to 500 sec/100 cc. A Gurley number less than 200 sec/100 cc causes the problem of insufficient heat resistance in the separator. A Gurley number exceeding 1,000 sec/100 cc abruptly increases the resistance of the separator, and the cycle characteristics and discharge characteristics of the battery using the separator become insufficient.

The microporous membrane of primarily polyethylene used in a separator according to the first aspect of the present invention includes therein large numbers of micropores, which are in communication with one another so as to allow for passage of a gas or a liquid from one surface to the other of the microporous membrane. Further, the microporous membrane is adapted to exhibit the shutdown function by closing the micropores upon heating to a predetermined temperature.

The thickness of the microporous membrane is about the same as or less than the thicknesses of microporous membranes used in conventional separators. A thin microporous membrane is preferred in the battery separator. However, in a configuration of the present invention, a microporous membrane thickness less than 7 µm is not preferable because it may lead to insufficient strength or insufficient shutdown function. Because of many industrially useful advantages offered by thin separators, there is an underlying demand for thin separators. To obtain a thin separator, the thickness of the microporous membrane should preferably be 7 to 16 µm.

Generally, forming the heat-resistant porous layer on the both surfaces or one surface of the microporous membrane of primarily polyethylene prevents meltdown, but it considerably lowers the performance of the shutdown function. Because the site of the shutdown function is the microporous membrane, reducing the thickness of the microporous membrane seriously impairs the shutdown function. However, with a Gurley number of 25 to 35 sec/100 cc·µm per unit thickness of the microporous membrane as in a separator according to the first aspect of the present invention, a desirable shutdown function can be obtained, and the ion permeability, involved in battery performance, becomes desirable even when the thickness of the microporous membrane is as thin as about 7 to 16 µm. A Gurley number per unit thickness of the microporous membrane less than 25 sec/100 cc·µm is not practical because it considerably lowers the performance of the shutdown function. When the Gurley number per unit thickness of the microporous membrane is in excess of 35 sec/100 cc·µm, the ion permeability becomes insufficient, and the resistance of the separator increases.

There is a correlation between the Gurley number of the microporous membrane of primarily polyethylene, and porosity. Accordingly, the microporous membrane in the first aspect of the present invention should appropriately have a porosity of 20% to 40%. A microporous membrane porosity less than 20% may lead to insufficient ion permeability. When the porosity exceeds 40%, the Gurley number becomes small, and this may lead to insufficient shutdown characteristics.

Preferably, the microporous membrane has a penetration strength of at least 250 g. When the penetration strength is less than 250 g, the essential function of the separator to prevent shorting in the battery will be lost, making it difficult to ensure safety.

In the first aspect of the present invention, the microporous membrane of primarily polyethylene may include polyolefins such as polypropylene and polymethylpentene, in addition to polyethylene. In terms of strength, a configuration including polypropylene is more preferable when using a low-molecular-weight polyethylene. Further, the microporous membrane may include, for example, a layer of polyethylene laminated to a layer of polypropylene. In this case, the polypropylene layer is preferably adapted to include a top layer that contains at least 80 weight % polyethylene, because the polypropylene layer has poor adhesion with the heat-resistant porous layer. When the top layer is a layer of 20 weight % or more polypropylene, the adhesion with the heat-resistant porous layer can be improved by a surfactant process or a corona discharge process.

In the first aspect of the present invention, the polyethylene used for the microporous membrane is not particularly limited. Preferably, a high-density polyethylene, or a mixture of a high-density polyethylene and an ultrahigh molecular weight polyethylene is used. Further, appropriate amounts of a low-molecular-weight polyolefin wax or an oligomer may be added. Preferably the polyethylene has a weight average molecular weight of 100,000 to 10,000,000. A polyethylene molecular weight of less than 100,000 and in excess of 10,000,000 is not preferable, because, when less than 100,000, the strength of the microporous membrane will be insufficient, and when in excess of 10,000,000, molding of the membrane becomes difficult. The weight average molecular weight of the polyethylene can be measured by gel permeation chromatography (GPC). Specifically, polyethylene is dissolved in o-dichlorobenzene at 140° C., and the solution so obtained is subjected to GPC after filtration with a sintered filter having a pore diameter of 0.45 µm.

The heat-resistant porous layer of a primarily heat-resistant polymer in a separator according to the first aspect of the present invention includes therein large numbers of micropores, which are in communication with one another to allow for passage of a gas or a liquid from one surface to the other of the heat-resistant porous layer. The heat-resistant porous layer so structured has a heat resistance sufficient enough to prevent meltdown even in the vicinity of the shutdown temperature of the microporous membrane of primarily polyethylene.

Preferably, the heat-resistant polymer is at least one kind selected from the group consisting of a wholly aromatic polyamide, a polyimide, a polyamide-imide, a polysulfone, and a polyether sulfone. With such heat-resistant polymers, the heat-resistant porous layer can have a sufficient heat resistance. The wholly aromatic polyamide is particularly preferable. The wholly aromatic polyamide can dissolve in a polar organic solvent, as represented by an amide solvent, in appropriate concentrations. Thus, by solidifying, water washing, and drying a solution (coating liquid) prepared by dissolving the wholly aromatic polyamide in an organic solvent and applied over the microporous membrane of primarily polyethylene, the heat-resistant porous layer can easily be formed into a coating. Further, control of the porous structure can easily be performed.

The wholly aromatic polyamide includes a meta-type and a para-type. Either form is usable in the present invention. However, meta-type wholly aromatic polyamides are preferable, and poly-m-phenyleneisophthalamides are more preferable. The para-type wholly aromatic polyamide does not usually dissolve in an organic solvent when it has a molecular weight necessary for usual forming, and a salt such as calcium chloride must be dissolved, or the molecular weight must be reduced to make it soluble in an organic solvent. The meta-type wholly aromatic polyamide is more preferable over the para-type wholly aromatic polyamide because it can be handled with less restriction. Further, the meta-type wholly aromatic polyamide is also preferable in terms of durability, because it is more resistant to oxidation and reduction than the para-type wholly aromatic polyamide. Further, because the meta-type wholly aromatic polyamide more easily forms a porous structure than the para-type wholly aromatic polyamide, a separator with superior permeability can be produced with good efficiency. For example, Patent Document 4 discloses an example in which a para-type wholly aromatic polyamide is used for the heat-resistant porous layer. Since the para-type wholly aromatic polyamide requires addition of ceramics for the control of a porous structure, even a porous structure cannot be obtained without adding ceramic particles. The meta-type wholly aromatic polyamide is also preferable over the para-type wholly aromatic polyamide in this regard, because it can form a porous structure without adding ceramic particles.

In preparing a coating liquid that contains the wholly aromatic polyamide, simply dissolving the wholly aromatic polyamide in a solvent is not always sufficient to obtain a separator having a desirable shutdown function, desirable ion permeability, and desirable heat shrinkage. In those instances, it is sometimes preferable to appropriately mix a solvent that serves as a poor solvent for meta-type wholly aromatic polyamides. However, this is difficult to achieve because the solubility for the solvent, and the coating liquid stability will be insufficient for the other heat-resistant polymers such as polyimides and para-type aromatic polyamides.

In the present invention, it is preferable that the meta-type wholly aromatic polyamide, when dissolved in N-methyl-2-pyrrolidone, have a logarithmic viscosity of from 0.8 to 2.5 dl/g, more preferably 1.0 to 2.2 dl/g, as represented by formula (1) below. Outside this range, formability suffers.

$$\text{Logarithmic viscosity(unit, dl/g)} = \ln(T/T0)/C \quad (1),$$

where T is the flow time of a solution containing 0.5 g of aromatic polyamide dissolved in 100 ml of N-methyl-2-pyrrolidone, as measured with a capillary viscometer at 30° C., T0 is the flow time of N-methyl-2-pyrrolidone as measured with a capillary viscometer at 30° C., and C is the polymer concentration in the polymer solution (g/dl).

The heat-resistant porous layer in the first aspect of the present invention includes inorganic fine particles having an average particle diameter of 0.1 to 1.0 μm. With the heat-resistant porous layer including inorganic fine particles having an average particle diameter of this range, the heat resistance of the heat-resistant porous layer can be improved, and the slidability problem can be overcome at the same time. Further, the volume ratio of the heat-resistant polymer and the inorganic fine particles can be confined within a range of the present invention. It is also possible to confine the thickness of the heat-resistant porous layer within a range of the present invention. When the average particle diameter of the inorganic fine particles is less than 0.1 μm, large amounts of heat-resistant polymer will be required to bind the inorganic fine particles. This makes it difficult to confine the volume ratio of the heat-resistant polymer and the inorganic fine particles within a range of the present invention, and the slidability cannot be improved as effectively. On the other hand, when the average particle diameter of the inorganic fine particles is in excess of 1.0 μm, formation of a thin heat-resistant porous layer becomes difficult, making it difficult to confine the thickness of the heat-resistant porous layer within a range of the present invention.

In a separator for a non-aqueous secondary battery according to the first aspect of the present invention, the volume of the inorganic fine particles contained is 40% to 80% with respect to the total volume of the heat-resistant polymer and the inorganic fine particles. Adding the inorganic fine particles in such a volume ratio improves the ion permeability of the separator, greatly reduces the heat shrinkage rate in a temperature range above the melting point of polyethylene, and enhances the performance of the shutdown function. Further, slidability becomes desirable. These effects are hardly obtained when the content of the inorganic fine particles is less than 40 volume percent. In fact, adding the inorganic fine particles in a proportion less than 40 volume percent is detrimental to the heat shrinkage rate and the shutdown function of the separator, and the effect of improving slidability will be small. On the other hand, an inorganic fine particle content in excess of 80 volume percent is not preferable because it causes the inorganic fine particles to fall off, which severely impairs ease of handling.

In examples according to the first aspect of the present invention, the microporous membrane of primarily polyethylene has a thickness of only 11 μm. Generally, the shutdown function will be insufficient when such a thin microporous membrane of primarily polyethylene is coated with the heat-resistant porous layer. Further, the shutdown function will also be insufficient when the Gurley number per unit thickness of the polyethylene microporous membrane is simply set within a range of the present invention (25 to 35 sec/100 cc·μm). However, the diligent study by the inventor of the present invention has found, rather surprisingly, that desirable shutdown characteristics can be obtained, and the high-temperature heat shrinkage can be sufficiently suppressed even with a thin polyethylene microporous membrane, when the content of the inorganic fine particles in the heat-resistant porous layer is 40 to 80 volume percent. Note that, in a separator that undergoes large heat shrinkage in a temperature range above the melting point of polyethylene, a relatively desirable shutdown function can be obtained even when a thin polyethylene microporous membrane is used; however, the problem of high-temperature heat shrinkage still remains, and the safety of the separator is insufficient.

The foregoing effects of the first aspect of the present invention can be explained as follows. First, the improper shutdown characteristics that occur when the heat-resistant porous layer does not include inorganic fine particles are considered to be due to the strong adhesion of the heat-resistant polymer to polyethylene, causing the heat-resistant porous layer to seriously inhibit the closure of the pores in the microporous membrane of primarily polyethylene. The addition of the inorganic fine particles to the heat-resistant porous layer is thought to improve the shutdown characteristics because the inorganic fine particles are not adherent to the polyethylene microporous membrane, and therefore do not inhibit the pore closure at the interface with the microporous membrane (the interface between the microporous membrane and the heat-resistant porous layer). Further, the inorganic particles of the heat-resistant porous layer, with the 40 to 80 volume percent content range, are thought to increase the compression modulus of the heat-resistant porous layer, making it possible to suppress heat shrinkage while ensuring desirable shutdown characteristics. This enables the thickness of the heat-resistant porous layer to be reduced.

The inorganic fine particles for the heat-resistant porous layer are not particularly limited. For example, oxides of alumina, titania, silica, zirconia, or the like are preferably used. Other preferable examples include carbonates, phosphates, and hydroxides. From the standpoint of impurity dissolution and durability, it is preferable that the inorganic fine particles have high crystallinity. Further, considering chemical stability, electrochemical stability, and specific gravity, it is preferable to use alumina, more preferably α-alumina.

When the inorganic fine particles are made of alumina, it is preferable that the inorganic fine particles account for 65% to 90% in weight with respect to the total weight of the heat-resistant polymer and the inorganic fine particles. With the content of alumina fine particles in this range, a separator can be obtained that excels in properties such as shutdown characteristics, heat shrinkage rate, and slidability.

In the first aspect of the present invention, when the heat-resistant porous layer is formed on the both surfaces of the microporous membrane, the total thickness of the heat-resistant porous layers is preferably 3 to 12 μm. When the heat-resistant porous layer is formed on only one surface of the microporous membrane, the thickness of the heat-resistant porous layer is preferably 3 to 12 μm. In either case, when the total thickness of the heat-resistant porous layer is less than 3

µm, a sufficient heat resistance cannot be obtained, and, in particular, the effect of suppressing the heat shrinkage will be lost. On the other hand, when the total thickness of the heat-resistant porous layer exceeds 12 µm, it becomes difficult to provide a separator of an appropriate thickness. As used herein, the "total thickness" of the heat-resistant porous layer, when it is formed on only one surface of the microporous membrane, assumes that the other surface of the microporous membrane has no thickness (0 µm).

In the first aspect of the present invention, the heat-resistant porous layer is formed on at least one surface of the microporous membrane of primarily polyethylene. However, considering ease of handling, durability, and the effectiveness of heat shrinkage prevention, the heat-resistant porous layer is preferably formed on the both surfaces. Specifically, by forming the heat-resistant porous layer on the both surfaces of the microporous membrane, the separator will not easily curl. This improves handling, and the separator does not easily degrade even when the battery is used for extended time periods. Further, the heat shrinkage of the separator under high temperature, which becomes more prominent as the thickness of the microporous membrane is reduced as in the present invention, can be appropriately prevented with the heat-resistant porous layer formed on the both surfaces of the microporous membrane, because it stabilizes the structure. Further, because a separator according to the first aspect of the present invention has desirable slidability, forming the heat-resistant porous layer on the both surfaces of the microporous membrane does not impede manufacture of the battery. When forming the heat-resistant porous layer on the both surfaces of the microporous membrane, it is preferable that the thicknesses be the same on the both surfaces. The first object of the present invention can also be achieved with a single-sided coating; however, the single-sided coating is not as effective as the double-sided coating in terms of ease of handling, durability, and heat shrinkage prevention.

[Producing Process of the Separator]

A producing process of a separator for a non-aqueous secondary battery according to the first aspect of the present invention is a process for producing a non-aqueous secondary battery separator that includes a microporous membrane of primarily polyethylene, and a heat-resistant porous layer of a primarily wholly aromatic polyamide formed on at least one surface of the microporous membrane, the process characterized by including:

(1) applying a coating liquid to at least one surface of the microporous membrane, the coating liquid including a wholly aromatic polyamide, inorganic fine particles, a solvent for dissolving the wholly aromatic polyamide, and a solvent that serves as a poor solvent for the wholly aromatic polyamide;

(2) solidifying the coating liquid by immersing the microporous membrane in a mixture of the solvent for dissolving the wholly aromatic polyamide, and the solvent that serves as a poor solvent for the wholly aromatic polyamide, after applying the coating liquid to the microporous membrane;

(3) performing water washing to remove the solvent mixture; and (4) performing drying to remove the water.

The solvent for dissolving the wholly aromatic polyamide in step (1) is, for example, an amide polar solvent such as N-methylpyrrolidone, dimethylacetoamide, or dimethylformamide. Use of dimethylacetoamide is particularly preferable because it improves the properties of the product separator.

One feature of a producing process of a separator of the present invention is that the coating liquid used in step (1) includes a solvent that serves as a poor solvent for the wholly aromatic polyamide. Inclusion of the poor solvent in the coating liquid makes it possible to desirably control the inner structure of the heat-resistant porous layer, and the structure at the interface of the heat-resistant porous layer and the polyethylene microporous membrane. This desirably improves the shutdown function, ion permeability, and heat shrinkage of the product separator. Examples of the poor solvent include alcohols and water. Tripropyleneglycol is particularly preferable.

A suitable ratio of the solvent for dissolving the wholly aromatic polyamide to the solvent that serves as a poor solvent depends on combinations of the solvents used, and as such it is difficult to give a specific value. However, the poor solvent is preferably added to such an extent that the wholly aromatic polyamide does not precipitate. Generally, the solvent that serves as a poor solvent is added in a range of 5 to 50 weight %, although the present invention is not so limited.

The content of the wholly aromatic polyamide with respect to the total of the solvent for dissolving the wholly aromatic polyamide and the solvent that serves as a poor solvent in the coating liquid is preferably 4 to 9 weight %. A wholly aromatic polyamide content exceeding 9 weight % is not preferable because it lowers the ion permeability of the separator, and the performance of the shutdown function. Further, in this case, the viscosity of the coating liquid, and the density of the inorganic fine particles in the slurry become too high, making it difficult to obtain an appropriate coating thickness. On the other hand, when the content of the wholly aromatic polyamide is less than 4 weight %, the wholly aromatic polyamide cannot bind the inorganic fine particles with sufficient strength. This makes it difficult to add a sufficient amount of inorganic fine particles.

In step (1), the method of adjusting the coating liquid is not particularly limited, as long as the wholly aromatic polyamide is sufficiently dissolved, and the inorganic fine particles are sufficiently dispersed. In one exemplary method, the wholly aromatic polyamide is dissolved in a solvent at high concentration, and the inorganic fine particles are dispersed therein before adding the remaining solvent.

When the coating liquid is applied to the both surfaces of the microporous membrane of primarily polyethylene in step (1), it is preferable that necessary amounts of the coating liquid be applied to the both surfaces of the microporous membrane by simultaneously supplying the coating liquid from the both sides of the microporous membrane. In one exemplary method, the excess coating liquid is supplied to the both surfaces of the microporous membrane, and any excess amount is scraped off by passing the membrane between two opposing Meyer bars spaced apart with a predetermined distance. In another exemplary method, the coating liquid is placed between two opposing Meyer bars separated by a predetermined distance, and the microporous membrane is passed between the Meyer bars to apply necessary amounts of the coating liquid on the both surfaces of the microporous membrane.

The coating method is not particularly limited when forming the coating liquid only on one surface of the microporous membrane of primarily polyethylene in step (1). In one exemplary method, the microporous membrane is anchored on a glass board, and the coating liquid is applied to one surface of the microporous membrane using the glass board and an opposing Meyer bar spaced apart with a predetermined distance.

The solidifying liquid used in step (2) is preferably a mixture of the solvent for dissolving the wholly aromatic polyamide, the poor solvent, and water, the solvents being the same solvents used for the coating liquid. The weight ratio of the solvent for dissolving the wholly aromatic polyamide to the solvent that serves as a poor solvent is preferably as in the coating liquid, and the water content of the solidifying liquid is preferably 40 to 95 weight %. The temperature of the solidifying liquid is preferably 10 to 70° C.

In performing the producing process above, it is more preferable to use meta-type wholly aromatic polyamide than para-type wholly aromatic polyamide, from the standpoint of coating liquid stability and the ion permeability (Gurley number) of the product separator. Poly-m-phenyleneisophthalamide is particularly preferable.

A producing method of a microporous membrane of primarily polyethylene of the present invention is not particularly limited. In one exemplary process, a gel mixture of polyethylene and liquid paraffin is extruded through a die, and cooled to produce a base tape, which is then stretched to extract the liquid paraffin.

In order to appropriately adjust the Gurley number of the microporous membrane in the foregoing process, it is preferable to adjust the polyethylene-to-liquid paraffin ratio, the stretch rate, the post-stretch heat fix temperature, and the post-extraction anneal temperature. The polyethylene-to-liquid paraffin ratio must be set so that the viscosity is sufficient to allow the gel to be extruded through the die. In this regard, the polyethylene content is preferably 50 weight % or less in the gel. Reducing the amount of polyethylene within this range lowers the Gurley number. The stretch rate must be set to have a sufficient strength, which is about 10 times or more in terms of an in-plane stretch rate. Increasing the stretch rate within this range lowers the Gurley number. The post-stretch heat fix and the post-extraction annealing are also intended to suppress heat shrinkage. The heat fix or annealing needs to be performed at a temperature no greater than the melting point of polyethylene, specifically about 135° C. or less. In order to ensure the quality of the microporous membrane, the heat fix temperature must be higher than the anneal temperature. The temperature difference affects the Gurley number of the microporous membrane—the greater the temperature difference, the higher the Gurley number. In the present invention, the temperature difference is preferably set to about 5° C. or more. In the present invention, the Gurley number of the microporous membrane can be appropriately set by appropriately adjusting these conditions.

[Battery]

A non-aqueous secondary battery according to the first aspect of the present invention includes an anode, a cathode, a separator according to the first aspect of the present invention disposed between the anode and cathode, and an electrolyte. The separator according to the first aspect of the present invention provides both the shutdown function and the heat resistance at high level, and greatly improves the safety of the non-aqueous secondary battery. In the first aspect of the present invention, such an effect becomes particularly prominent in a non-aqueous secondary battery having an energy density of 500 wh/L or more, a capacity of 2.4 Ah or more, or an output density of 1.5 kwh·L or more. The safety issue becomes more pronounced in a battery module employing serial/parallel battery connections. The non-aqueous secondary battery according to the first aspect of the present invention is also effective in this regard.

Generally, the anode includes a collector coated with a layer of an anode active material, a binder, and a conduction enhancer. To produce the anode of this construction, the anode active material, the binder, and the conduction enhancer are added to a solvent, and kneaded to obtain a slurry, which is then coated over the collector before drying and pressing. The anode active material, the binder, and the conduction enhancer are preferably 80 to 98 weight %, 2 to 20 weight %, and 0 to 10 weight %, respectively, with respect to the total 100% weight of the anode active material, the binder, and the conduction enhancer. Examples of the anode active material include carbon materials, silicon, and tin. The carbon materials include those obtained from easy-to-graphitize pitch, such as mesocarbon microbeads and a micro carbon fiber, used as the precursor, and those in which materials that are difficult to graphitize, such as phenolic resin, are used as the precursor. Examples of the binder include polyvinylidene fluoride and carboxymethyl cellulose. Preferable examples of the conduction enhancer include a graphite powder, acetylene black, Ketjen black, and a vapor grown carbon fiber. Preferable examples of the collector include a copper foil and stainless steel.

As with the anode, the cathode generally includes a collector coated with a layer of a cathode active material, a binder, and a conduction enhancer. To produce the cathode of this construction, the cathode active material, the binder, and the conduction enhancer are added to a solvent, and kneaded to obtain a slurry, which is then coated over the collector before drying and pressing. The cathode active material, the binder, and the conduction enhancer are preferably 80 to 98 weight %, 2 to 20 weight %, and 0 to 10 weight %, respectively, with respect to the total 100% weight of the cathode active material, the binder, and the conduction enhancer. Examples of the cathode active material include $LiCoO_2$, $LiNiO_2$, spinel $LiMn_2O_4$, and olivine $LiFePO_4$, and solid solutions of these materials with dissimilar elements. These materials may be used as a mixture. As the binder, polyvinylidene fluoride is preferably used. Preferable examples of the conduction enhancer include a graphite powder, acetylene black, Ketjen black, and a vapor grown carbon fiber. Preferable examples of the collector include an aluminum foil and stainless steel.

The electrolyte is a non-aqueous electrolyte prepared by dissolving a lithium salt in a non-aqueous solvent. Preferable examples of the lithium salt include $LiPF_6$, $LiBF_4$, and $LiClO_4$. Examples of the non-aqueous solvent include propylene carbonate (PC), ethylene carbonate (EC), dimethyl carbonate (DMC), diethyl carbonate (DEC), and ethylmethyl carbonate (EMC). The lithium salts and the non-aqueous solvents may be used either alone or in a combination of two or more. The concentration range of the lithium salt is preferably 0.5 to 2.0 M. Considering durability, it is preferable to add vinylene carbonate to the electrolyte.

In the non-aqueous secondary battery according to the first aspect of the present invention, it is preferable, considering durability under high temperature, to dispose the heat-resistant porous layer on the cathode side, when the heat-resistant porous layer is formed only on one surface of the microporous membrane of primarily polyethylene in the separator. Sufficient battery properties can be obtained with the heat-resistant porous layer disposed on the anode side; however, durability under high temperature will not be as good as the arrangement in which the heat-resistant porous layer is disposed on the cathode side.

In the non-aqueous secondary battery according to the first aspect of the present invention, the battery element including the cathode, the anode, and the separator is sealed in a package by being wound into a cylindrical or a flat structure, or by being laminated. The package may be of any form, including a metal casing, and a casing of an aluminum laminated film, for example.

Second Aspect of the Present Invention

The second aspect of the present invention is described below in detail.

[Separator for Non-Aqueous Secondary Battery]

A separator for a non-aqueous secondary battery according to the second aspect of the present invention includes a microporous membrane of primarily polyethylene, and a heat-resistant porous layer of primarily at least one kind of heat-resistant polymer selected from the group consisting of a wholly aromatic polyamide, a polyimide, a polyimide-imide, a polysulfone, and a polyether sulfone, the heat-resistant porous layer being formed on at least one surface of the microporous membrane, the separator characterized in that:

(1) the microporous membrane has a Gurley number of 25 to 35 sec/100 cc·μm per unit thickness;

(2) the microporous membrane has a thickness of 7 to 16 μm;

(3) the heat-resistant polymer is coated in an amount of 2 to 3 g/m$^2$;

(4) the heat-resistant porous layer has a total thickness of 3 to 7 μm when formed on both surfaces of the microporous membrane, and a thickness of 3 to 7 μm when formed on only one surface of the microporous membrane; and (5) the heat-resistant porous layer has a porosity of 40% to 60%.

By satisfying the foregoing conditions (1) to (5) at the same time, the separator can exhibit desirable shutdown characteristics, effectively prevent heat shrinkage at high temperatures, and can be formed with a reduced thickness. It is therefore possible to improve the safety of the non-aqueous secondary battery.

According to the second aspect of the present invention, the property requirements can be satisfied even when the thickness of the separator is 20 μm or less. Accordingly, it is preferable that the separator according to the second aspect of the present invention have a thickness of 20 μm or less, more preferably 10 to 18 μm. When the thickness of the separator is less than 10 μm, it becomes difficult to obtain sufficient strength and ensure safety even with a technique of the present invention.

The microporous membrane of primarily polyethylene used for a separator according to the second aspect of the present invention includes therein large numbers of micropores, which are in communication with one another to allow for passage of a gas or a liquid from one surface to the other of the microporous membrane. The microporous membrane is structured so that, when heated to a predetermined temperature, the micropores therein close to exhibit the shutdown function.

In the second aspect of the present invention, the microporous membrane must have a thickness of 7 to 16 μm. In a technique of the present invention, when the thickness of the microporous membrane is less than 7 μm, a sufficient strength and a sufficient shutdown function cannot be obtained. When in excess of 16 μm, the thickness of the separator as a whole will be no different from the thickness of conventional separators.

In the second aspect of the present invention, the microporous membrane of primarily polyethylene has a Gurley number of 25 to 35 sec/100 cc·μm per unit thickness, and the heat-resistant porous layer has a porosity of 40% to 60%. This makes it possible to sufficiently maintain the shutdown characteristics and prevent meltdown even with the microporous membrane of the thickness as thin as 7 to 16 km. A Gurley number less than 25 sec/100 cc·μm per unit thickness of the microporous membrane is not practical because it considerably lowers the performance of the shutdown function upon coating the heat-resistant porous layer. When the Gurley number is in excess of 35 sec/100 cc·μm, the ion permeability becomes insufficient, and the resistance of the separator increases undesirably. Further, the ion permeability will be insufficient, and the separator resistance increases when the porosity of the heat-resistant porous layer is less than 40%. A porosity of the heat-resistant porous layer exceeding 60% is not preferable because it may lead to significant decrease in the performance of the shutdown function, or insufficient heat resistance.

In the second aspect of the present invention, the heat-resistant polymer is coated in an amount of 2 to 3 g/m$^2$. When the coating amount is less than 2 g/m$^2$, it may not be possible to sufficiently prevent the heat shrinkage of the separator. On the other hand, a coating amount exceeding 3 g/m$^2$ is not preferable because, in this case, the porosity of the heat-resistant porous layer becomes too low when the thickness of the heat-resistant porous layer is about 7 μm. Further, an attempt to set an appropriate porosity overly increases the thickness of the heat-resistant porous layer.

In the second aspect of the present invention, when the heat-resistant porous layer is formed on the both surfaces of the microporous membrane, the total thickness of the heat-resistant porous layers is preferably 3 to 7 μm. When the heat-resistant porous layer is formed on only one surface of the microporous membrane, the thickness of the heat-resistant porous layer is preferably 3 to 7 μm. In either case, when the total thickness of the heat-resistant porous layer is 3 μm or less, a sufficient heat resistance will not be obtained, and, in particular, the effect of suppressing the heat shrinkage will be lost. On the other hand, when the total thickness of the heat-resistant porous layer exceeds 7 μm, it becomes difficult to provide a separator of an appropriate thickness. As used herein, the "total thickness" of the heat-resistant porous layer, when it is formed on only one surface of the microporous membrane, assumes that the other surface of the microporous membrane has no thickness (0 μm).

There is a correlation between the Gurley number of the microporous membrane of primarily polyethylene, and porosity. Accordingly, the microporous membrane in the second aspect of the present invention should appropriately have a porosity of 20% to 40%. A microporous membrane porosity less than 20% may lead to insufficient ion permeability. When the porosity exceeds 40%, the Gurley number becomes small, and this may lead to insufficient shutdown characteristics.

In the second aspect of the present invention, it is preferable that the heat shrinkage rate of the microporous membrane at 105° C. be 10% or less, both in MD direction and TD direction. When the heat shrinkage rate of the microporous membrane exceeds 10%, it becomes difficult to sufficiently prevent heat shrinkage even when the heat-resistant porous layer configured according to the present invention is coated on one surface or both surfaces of the microporous membrane.

Preferably, the microporous membrane has a penetration strength of 250 g or more. When the penetration strength is less than 250 g, the essential function of the separator to prevent shorting in the battery may be lost, making it difficult to ensure safety.

Regarding the materials usable for the microporous membrane according to the second aspect of the present invention, no further explanation will be made because they are as in the foregoing first aspect of the present invention.

The heat-resistant porous layer of a primarily heat-resistant polymer in a separator according to the second aspect of the present invention includes therein large numbers of micropores, which are in communication with one another to allow for passage of a gas or a liquid from one surface to the other of the heat-resistant porous layer. The heat-resistant porous layer so structured has a heat resistance sufficient enough to prevent meltdown even in the vicinity of the shutdown temperature of the microporous membrane of primarily polyethylene.

Preferably, the heat-resistant polymer is at least one kind of heat-resistant polymer selected from the group consisting of a wholly aromatic polyamide, a polyimide, a polyamide-imide, a polysulfone, and a polyether sulfone. The wholly aromatic polyamide is preferable, meta-type wholly aromatic polyamide is more preferable, and poly-m-phenyleneisophthalamide is particularly preferable. The reasons that meta-type wholly aromatic polyamide, and particularly poly-m-phenyleneisophthalamide are preferable, and the specific constitution of the meta-type wholly aromatic polyamide are essentially as in the foregoing first aspect of the present invention, and no further explanation will be made.

In the second aspect of the present invention, the heat-resistant porous layer is formed on at least one surface of the microporous membrane of primarily polyethylene. However, considering ease of handling, durability, and the effectiveness of heat shrinkage prevention, the heat-resistant porous layer is preferably formed on the both surfaces. The reason for this is as described in the foregoing first aspect of the present invention. When forming the heat-resistant porous layer on the both surfaces of the microporous membrane, it is preferable that the thicknesses be the same on the both surfaces.

[Producing Process of the Separator]

A producing process of a separator for a non-aqueous secondary battery according to the second aspect of the present invention includes the following steps (1) to (4):

(1) applying a coating liquid to at least one surface of the microporous membrane, the coating liquid including a wholly aromatic polyamide, a solvent for dissolving the wholly aromatic polyamide, and a solvent that serves as a poor solvent for the wholly aromatic polyamide;

(2) solidifying the coating liquid by immersing the microporous membrane in a mixture of the solvent for dissolving the wholly aromatic polyamide, and the solvent that serves as a poor solvent for the wholly aromatic polyamide, after applying the coating liquid to the microporous membrane;

(3) performing water washing to remove the solvent mixture; and (4) performing drying to remove the water.

Note that the elements of steps (1) and (2), such as the solvent for dissolving the wholly aromatic polyamide, the solvent that serves as a poor solvent for the wholly aromatic polyamide, the mixture ratio of the solvents, the concentration of the wholly aromatic polyamide, the coating method, and the constitution of the solidifying liquid are essentially as in the foregoing first aspect of the present invention. Further, the producing method of the microporous membrane of primarily polyethylene is as in the first aspect of the present invention. As such, no further explanation will be made regarding these.

[Battery]

A non-aqueous secondary battery according to the second aspect of the present invention includes an anode, a cathode, a separator according to the second aspect of the present invention disposed between the anode and cathode, and an electrolyte. The separator according to the second aspect of the present invention provides both the shutdown function and the heat resistance at high level, and greatly improves the safety of the non-aqueous secondary battery. In the second aspect of the present invention, such an effect becomes particularly prominent in a non-aqueous secondary battery having an energy density of 500 wh/L or more, a capacity of 2.4 Ah or more, or an output density of 1.5 kwh·L or more. The safety issue becomes more pronounced in a battery module employing serial/parallel battery connections. The non-aqueous secondary battery according to the second aspect of the present invention is also effective in this regard.

Note that the specific configuration of the non-aqueous secondary battery according to the second aspect of the present invention is essentially as in the foregoing first aspect of the present invention, and accordingly no further explanation will be made.

EXAMPLES

Examples According to the First Aspect of the Present Invention

Examples according to the first aspect of the present invention are described below.

Measurement Methods

[Average Particle Diameter]

Measurement was made using a laser diffraction particle distribution measurement device. Water was used as the dispersion medium of the inorganic fine particles, and a trace amount of a nonionic surfactant Triton X-100 was used as the dispersant. The medium particle diameter (D50) of the resulting volume particle distribution was taken as the average particle diameter.

[Gurley Number]

Measurement of Gurley number was made according to JIS P8117.

[Thickness]

The thickness of the polyethylene microporous membrane was measured at a total of 20 points, using a contact-type thickness meter (Digimatic Indicator: Mitsutoyo Corporation), and the average of these points was taken. Measurement was performed under the setting that a load of 1.2 kg/cm$^2$ was applied to the contact terminal when measuring the thickness. The thickness of the porous layer was measured by subtracting the thickness of the polyethylene microporous membrane from the thickness of the product separator measured in the same manner.

[Heat Shrinkage Rate]

The heat shrinkage rate was measured as follows. A sample measuring 18 cm (MD direction)×6 cm (TD direction) was cut out. The sample was marked at two locations: point A, 2 cm from the top; and point B, 17 cm from the top, on the perpendicular bisector of the TD. The sample was also marked at two locations: point C, 1 cm from the left; and point D, 5 cm from the left, on the perpendicular bisector of the MD. With a clip, the sample was hung in an oven adjusted to 175° C., where it was heat treated for 30 minutes under no tension. The distance between points A and B, and the distance between points C and D were measured before and after the heat treatment, and the heat shrinkage rate was determined using the following equations.

$$MD \text{ heat shrinkage rate} = \{(\text{distance } AB \text{ before heat treatment} - \text{distance } AB \text{ after heat treatment})/\text{distance } AB \text{ before heat treatment}\} \times 100$$

$$TD \text{ heat shrinkage rate} = \{(\text{distance } CD \text{ before heat treatment} - \text{distance } CD \text{ after heat treatment})/\text{distance } CD \text{ before heat treatment}\} \times 100$$

19

[Penetration Strength]

A penetration test was performed using a KES-G5 handy compression tester available from Kato Tech Co., Ltd. (curvature radius at the needle tip, 0.5 mm; penetration speed, 2 mm/sec). The maximum penetration load was taken as the penetration strength. In the test, the sample was anchored on a metal frame (sample holder) having an 11.3 mm hole (ø), by being clamped with a silicone rubber packing.

[Slidability 1]

The separator was dragged on a SUS board. The slidability of the sample was deemed as being "desirable" when it slid without any difficulty, and "undesirable" when it had difficulty sliding.

[Slidability 2]

The slidability of the separator was evaluated by measuring a coefficient of friction of the separator, using a card friction tester available from Toyo Seiki. Specifically, the separator was attached to a 1-kg load weight, and the force required to push the weight with the separator in contact with the SUS stage surface of the tester was measured. The coefficient of friction was determined from the force so obtained, and a normal force. The separator was attached to a 7-cm$^2$ planar area of the weight.

Example 1-1

A polyethylene microporous membrane was used that had a unit weight of 6.99 g/m$^2$, a thickness of 11 µm, a Gurley number of 322 seconds (29.3 sec/100 cc·µm), and a penetration strength of 443 g. The polyethylene microporous membrane had a weight average molecular weight of 1,270,000.

As the meta-type wholly aromatic polyamide, the poly-m-phenyleneisophthalamide Conex® (Teijin Techno Products Limited) was used. As the inorganic fine particles, α-alumina having an average particle diameter of 0.8 µm (Iwatani Kagaku Kogyo, SA-1) was used. The Conex and the alumina were adjusted to a weight ratio of 30:70 (volume ratio of 55:45), and the mixture was added to a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. Here, the clearance between the Meyer bars was adjusted to 30 µm, and the both Meyer bars were of size 6. The polyethylene microporous membrane was immersed in a solidifying liquid at 40° C. (water:mixed solvent=50:50, weight ratio), followed by water washing and drying. As a result, a heat-resistant porous layer was formed on the both surfaces of the polyethylene microporous membrane.

The properties of the separator for a non-aqueous secondary battery of the present invention produced as above are as follows.

Thickness: 15 µm
Thickness of coating layer: 4 µm
Coating amount: 5.26 g/m$^2$
Gurley number: 447 sec/100 cc
Heat shrinkage rate at 175° C.: 22% in MD direction, 19% in TD direction
Slidability: Desirable
Coefficient of friction: 0.52

20

Example 1-2

The same polyethylene microporous membrane, meta-type wholly aromatic polyamide, and inorganic fine particles of Example 1-1 were used.

The Conex and the alumina were adjusted to a weight ratio of 20:80 (volume ratio of 42:58), and the mixture was added to a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. Here, the clearance between the Meyer bars was adjusted to 30 µm, and the both Meyer bars were of size 6. The polyethylene microporous membrane was immersed in a solidifying liquid at 40° C. (water:mixed solvent=50:50, weight ratio), followed by water washing and drying. As a result, a heat-resistant porous layer was formed on the both surfaces of the polyethylene microporous membrane.

The properties of the separator for a non-aqueous secondary battery of the present invention produced as above are as follows.

Thickness: 15 µm
Thickness of coating layer: 4 µm
Coating amount: 5.64 g/m$^2$
Gurley number: 435 sec/100 cc
Heat shrinkage rate at 175° C.: 21% in MD direction, 18% in TD direction
Slidability: Desirable
Coefficient of friction: 0.49

Example 1-3

The same polyethylene microporous membrane and meta-type wholly aromatic polyamide of Example 1-1 were used.

As the inorganic fine particles, α-alumina having an average particle diameter of 0.8 µm (Showa Denko, AL160 SG-3) was used. The Conex and the alumina were adjusted to a weight ratio of 15:85 (volume ratio of 34:66), and the mixture was added to a 50:50 weight-ratio mixed solvent of dimethylacetoamide (DMAc) and tripropyleneglycol (TPG) so as to make the Conex content 5.5 weight %. The resultant mixture was obtained as the coating liquid.

Two Meyer bars were disposed opposite to each other. The clearance between the Meyer bars was adjusted to 30 µm, and the both Meyer bars were of size 6. The polyethylene microporous membrane was passed between the Meyer bars by drawing it while supplying the coating liquid from the both sides of the Meyer bars, so as to apply the coating liquid on the both surfaces of the polyethylene microporous membrane. Then, the polyethylene microporous membrane was immersed in a solidifying liquid at 40° C. (water:mixed solvent=50:50, weight ratio), followed by water washing and drying. As a result, a porous layer of Conex and alumina was formed on the both surfaces of the polyethylene microporous membrane.

The properties of the separator for a non-aqueous secondary battery of the present invention produced as above are as follows.

Thickness: 18 µm
Thickness of coating layer: 7
Coating amount: 8.09 g/m$^2$

Gurley number: 380 sec/100 cc
Heat shrinkage rate at 175° C.: 11% in MD direction, 10% in TD direction
Slidability: Desirable
Coefficient of friction: 0.45

Example 1-4

The same polyethylene microporous membrane and coating liquid of Example 1-3 were used.

The polyethylene microporous membrane was anchored on a glass board, and the coating liquid was applied on one surface of the polyethylene microporous membrane using a Meyer bar of size 6. The clearance between the Meyer bar and the polyethylene microporous membrane was 10 µm. After applying the coating liquid, the polyethylene microporous membrane was immersed in a solidifying liquid at 40° C. (water:mixed solvent=50:50, weight ratio), followed by water washing and drying. As a result, a heat-resistant porous layer was formed on one surface of the polyethylene microporous membrane.

The properties of the separator for a non-aqueous secondary battery of the present invention produced as above are as follows.
Thickness: 16 µm
Thickness of coating layer: 5 µm
Coating amount: 6.56 g/m$^2$
Gurley number: 364 sec/100 cc
Heat shrinkage rate at 175° C.: 19% in MD direction, 18% in TD direction
Slidability: Desirable
Coefficient of friction: 0.44

Note that curling occurred in the single-coated separator of Example 1-4, and the ease of handling was not as preferable as that of the double-coated separator of Example 1-3.

Example 1-5

The same polyethylene microporous membrane of Example 1-1 was used.

151 parts by weight of calcium chloride was added to 2,200 parts by weight of N-2-methylpyrrolidone, and the mixture was heated to 100° C. to completely dissolve the calcium chloride. The solution was allowed to cool to room temperature, and 68.23 parts by weight of para-phenylene diamine was added and completely dissolved. Then, 124.97 g of terephthalic acid dichloride was added to the solution at 20° C. The mixture was aged for one hour at a maintained temperature of 20° C. with stirring, and filtered with a 1,500-mesh stainless steel wire mesh. By adding tripropyleneglycol (TPG), a solution was obtained that contained 6 weight % p-phenylene terephthalamide dissolved in a 95:5 weight-ratio mixture of N-2-methylpyrrolidone and tripropyleneglycol (TPG).

Then, α-alumina having an average particle diameter of 0.8 µm (Showa Denko, AL160 SG-3) was added to the solution and dispersed therein at a p-phenylene terephthalamide:alumina weight ratio of 20:80 (volume ratio=42:58), so as to obtain a coating liquid.

Two Meyer bars were disposed opposite to each other. The clearance between the Meyer bars was adjusted to 30 µm, and the both Meyer bars were of size 6. The polyethylene microporous membrane was passed between the Meyer bars by drawing it while supplying the coating liquid from the both sides of the Meyer bars, so as to apply the coating liquid on the both surfaces of the polyethylene microporous membrane. Then, the polyethylene microporous membrane was immersed in a solidifying liquid at 40° C. (water:N-2-methylpyrrolidone=50:50, weight ratio), followed by water washing and drying. As a result, a heat-resistant porous layer was formed on the both surfaces of the polyethylene microporous membrane.

The properties of the separator for a non-aqueous secondary battery of the present invention produced as above are as follows.
Thickness: 18 µm
Thickness of coating layer: 7 µm
Coating amount: 7.23 g/m$^2$
Gurley number: 936 sec/100 cc
Heat shrinkage rate at 175° C.: 14% in MD direction, 13% in TD direction
Slidability: Desirable
Coefficient of friction: 0.51

Comparative Example 1-1

The same polyethylene microporous membrane, meta-type wholly aromatic polyamide, and inorganic fine particles of Example 1-1 were used.

The Conex and the alumina were adjusted to a weight ratio of 90:10 (volume ratio of 96:4), and the mixture was added to a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. Here, the clearance between the Meyer bars was adjusted to 30 µm, and the both Meyer bars were of size 6. The polyethylene microporous membrane was immersed in a solidifying liquid at 40° C. (water:mixed solvent=50:50, weight ratio), followed by water washing and drying. As a result, a heat-resistant porous layer was formed on the both surfaces of the polyethylene microporous membrane.

The properties of the separator for a non-aqueous secondary battery produced as above are as follows.
Thickness: 15 µm
Thickness of coating layer: 4 µm
Coating amount: 2.38 g/m$^2$
Gurley number: 453 sec/100 cc
Heat shrinkage rate at 175° C.: 37% in MD direction, 23% in TD direction
Slidability: Undesirable
Coefficient of friction: 0.95

Comparative Example 1-2

The same polyethylene microporous membrane, meta-type wholly aromatic polyamide, and inorganic fine particles of Example 1-1 were used.

The Conex and the alumina were adjusted to a weight ratio of 50:50 (volume ratio of 74:26), and the mixture was added to a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. Here, the clearance between the Meyer bars was adjusted to 30 μm, and the both Meyer bars were of size 6. The polyethylene microporous membrane was immersed in a solidifying liquid at 40° C. (water:mixed solvent=50:50, weight ratio), followed by water washing and drying. As a result, a heat-resistant porous layer was formed on the both surfaces of the polyethylene microporous membrane.

The properties of the separator for a non-aqueous secondary battery produced as above are as follows.
Thickness: 15 μm
Thickness of coating layer: 4 μm
Coating amount: 2.15 g/m$^2$
Gurley number: 452 sec/100 cc
Heat shrinkage rate at 175° C.: 53% in MD direction, 36% in TD direction
Slidability: Undesirable
Coefficient of friction: 0.75

Comparative Example 1-3

The same polyethylene microporous membrane, meta-type wholly aromatic polyamide, and inorganic fine particles of Example 1-1 were used.

The Conex and the alumina were adjusted to a weight ratio of 5:95 (volume ratio of 13:87), and the mixture was added to a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. Here, the clearance between the Meyer bars was adjusted to 30 μm, and the both Meyer bars were of size 6. The polyethylene microporous membrane was immersed in a solidifying liquid at 40° C. (water:mixed solvent=50:50, weight ratio), followed by water washing and drying. As a result, the coating layer was detached, and no heat-resistant porous layer was formed on the polyethylene microporous membrane.

Comparative Example 1-4

The same polyethylene microporous membrane and meta-type wholly aromatic polyamide of Example 1-1 were used.

As the inorganic fine particles, α-alumina having an average particle diameter of 2.0 μm (Iwatani Kagaku Kogyo, RA-1) was used. The Conex and the alumina were adjusted to a weight ratio of 30:70 (volume ratio of 55:45), and the mixture was added to a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. Here, the clearance between the Meyer bars was adjusted to 50 μm, and the both Meyer bars were of size 8. During this process, large numbers of streaks were formed, and it was difficult to uniformly apply the coating liquid.

Comparative Example 1-5

A polyethylene microporous membrane was used that had a unit weight of 7.72 g/m$^2$, a thickness of 12 μm, a Gurley number of 257 seconds (21.4 sec/100 cc·μm), and a penetration strength of 300 g. The polyethylene microporous membrane had a weight average molecular weight of 530,000.

The same meta-type wholly aromatic polyamide and inorganic fine particles of Example 1-1 were used. The Conex and the alumina were adjusted to a weight ratio of 30:70 (volume ratio of 55:45), and the mixture was added to a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. Here, the clearance between the Meyer bars was adjusted to 30 μm, and the both Meyer bars were of size 6. The polyethylene microporous membrane was immersed in a solidifying liquid at 40° C. (water:mixed solvent=50:50, weight ratio), followed by water washing and drying. As a result, a Conex porous layer was formed on the both surfaces of the polyethylene microporous membrane.

The properties of the separator for a non-aqueous secondary battery produced as above are as follows.
Thickness: 15 μm
Thickness of coating layer: 4 μm
Coating amount: 5.07 g/m$^2$
Gurley number: 412 sec/100 cc
Heat shrinkage rate at 175° C.: 15% in MD direction, 10% in TD direction
Slidability: Desirable
Coefficient of friction: 0.53

Comparative Example 1-6

In Comparative Example 1-6, no inorganic fine particles were added.

The same polyethylene microporous membrane and meta-type wholly aromatic polyamide of Example 1-1 were used. The Conex was added to a 70:30 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. Here, the clearance between the Meyer bars was adjusted to 30 μm, and the both Meyer bars were of size 6. The polyethylene microporous membrane was immersed in a solidifying liquid at 40° C. (water:mixed solvent=80:20, weight ratio), followed by water washing and drying. As a result, a heat-resistant porous layer was formed on the both surfaces of the polyethylene microporous membrane.

The properties of the separator for a non-aqueous secondary battery produced as above are as follows.
Thickness: 15 μm
Thickness of coating layer: 4 μm
Coating amount: 2.07 g/m$^2$ Gurley number: 482 sec/100 cc
Heat shrinkage rate at 175° C.: 37% in MD direction, 20% in TD direction
Slidability: Undesirable
Coefficient of friction: 0.90

Comparative Example 1-7

The same polyethylene microporous membrane, meta-type wholly aromatic polyamide, and inorganic fine particles of Example 1-3 were used.

The Conex and the alumina were adjusted to a weight ratio of 40:60 (volume ratio of 66:34), and the mixture was added to a 50:50 weight-ratio mixed solvent of dimethylacetoamide (DMAc) and tripropyleneglycol (TPG) so as to make the Conex content 5.5 weight %. The resultant mixture was obtained as the coating liquid.

The polyethylene microporous membrane was anchored on a glass board, and the coating liquid was applied on one surface of the polyethylene microporous membrane using a Meyer bar of size 6. The clearance between the Meyer bar and the polyethylene microporous membrane was 10 μm. After applying the coating liquid, the polyethylene microporous membrane was immersed in a solidifying liquid at 40° C. (water:mixed solvent=50:50, weight ratio), followed by water washing and drying. As a result, a heat-resistant porous layer was formed on one surface of the polyethylene microporous membrane.

The properties of the separator for a non-aqueous secondary battery produced as above are as follows.
Thickness: 16 μm
Thickness of coating layer: 5 μm
Coating amount: 4.57 g/m$^2$
Gurley number: 372 sec/100 cc
Heat shrinkage rate at 175° C.: 41% in MD direction, 30% in TD direction
Slidability: Desirable
Coefficient of friction: 0.64

It can be seen from the results of Examples 1-3, 1-4, and Comparative Example 1-7 that similar results can be obtained regardless of whether the coating is formed on one surface or both surfaces of the polyethylene microporous membrane. It should be noted here that the effect of suppressing the heat shrinkage rate is not as effective in Comparative Example 1-7, because the content of the inorganic fine particles falls outside the range of the present invention.

Comparative Example 1-8

The same polyethylene microporous membrane and meta-type wholly aromatic polyamide of Example 1-1 were used.

As the inorganic fine particles, α-alumina having an average particle diameter of 13 nm (Nippon Aerosil, alumina C) was used. The Conex and the alumina were adjusted to a weight ratio of 30:70 (volume ratio of 55:45), and the mixture was added to a 50:50 weight-ratio mixed solvent of dimethylacetoamide (DMAc) and tripropyleneglycol (TPG) so as to make the Conex content 5.5 weight %. The resultant mixture was obtained as the coating liquid.

Two Meyer bars were disposed opposite to each other. The clearance between the Meyer bars was adjusted to 30 μm, and the both Meyer bars were of size 6. The polyethylene microporous membrane was passed between the Meyer bars by drawing it while supplying the coating liquid from the both sides of the Meyer bars, so as to apply the coating liquid on the both surfaces of the polyethylene microporous membrane. Then, the polyethylene microporous membrane was immersed in a solidifying liquid at 40° C. (water:mixed solvent=50:50, weight ratio), followed by water washing and drying. As a result, a heat-resistant porous layer was formed on the both surfaces of the polyethylene microporous membrane.

The properties of the separator for a non-aqueous secondary battery produced as above are as follows.
Thickness: 17 μm
Thickness of coating layer: 6 μm
Coating amount: 6.13 g/m$^2$
Gurley number: 395 sec/100 cc
Heat shrinkage rate at 175° C.: 21% in MD direction, 15% in TD direction
Slidability: Undesirable
Coefficient of friction: 0.88

It can be seen from the result of Comparative Example 1-8 that the slidability suffers when the average particle diameter of the inorganic fine particles is less than 0.1 μm.

Comparative Example 1-9

A porous layer of p-phenylene terephthalamide and alumina was formed on the both surfaces of the polyethylene microporous membrane as in Example 1-5, except that the weight ratio of p-phenylene terephthalamide and alumina was 70:30 (volume ratio=87:13).

The properties of the separator for a non-aqueous secondary battery produced as above are as follows.
Thickness: 18
Thickness of coating layer: 7 μm
Coating amount: 2.53 g/m$^2$
Gurley number: 1,568 sec/100 cc
Heat shrinkage rate at 175° C.: 48% in MD direction, 25% in TD direction
Slidability: Undesirable
Coefficient of friction: 0.86

It can be seen from the results of Example 1-5 and Comparative Example 1-9 that the effect of preventing heat shrinkage can also be obtained with the use of p-phenylene terephthalamide, as long as the volume ratio of the wholly aromatic polyamide and the inorganic fine particles is within the range of the present invention. It can also be seen, however, that the p-phenylene terephthalamide, with its high Gurley number, is not as preferable as the m-phenylene isophthalamide in terms of ion permeability.

FIG. 1 is a graph representing the separators of Examples 1-1, 1-2, and Comparative Examples 1-1, 1-2, 1-3, and 1-6 produced as above. The graph plots heat shrinkage rate at 175° C. (vertical axis) against the amount of alumina added (volume fraction of alumina with respect to the total of meta-type wholly aromatic polyamide and alumina; horizontal axis). It can be seen from FIG. 1 that the alumina is detrimental to heat shrinkage when added in small amounts, but desirably suppresses the heat shrinkage rate when added in appropriate amounts.

[Evaluation of Shutdown Characteristics]

The separator produced as above was impregnated with electrolyte, and placed between SUS boards. As the electrolyte, a 1 M solution of $LiBF_4$ dissolved in a mixed solvent of propylene carbonate and ethylene carbonate (1:1 weight ratio) was used. The separator so prepared was sealed in a coin cell, which was then connected to a lead, and placed in an oven with a thermocouple. The resistance was measured by applying alternating current (amplitude, 10 mV; frequency, 1 kHz) while increasing the temperature at a rate of 1.6° C./min.

Figure 2:
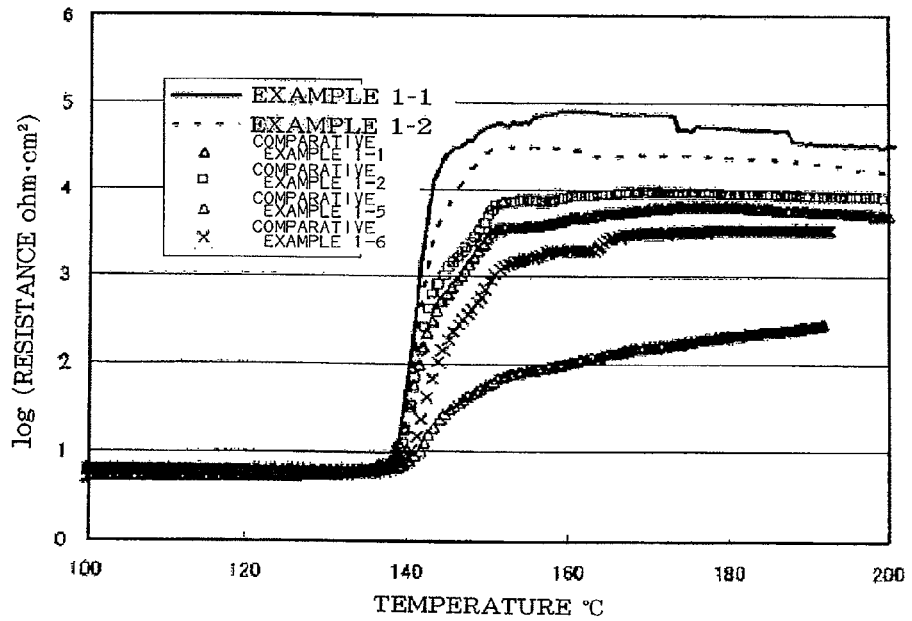
FIG. 2 is a graph concerning an example according to the first aspect of the present invention, representing a result of the evaluation of a shutdown function.

The results are represented in FIG. 2. By comparing the Examples and the Comparative Examples, it can be seen that the separators coated with the heat-resistant porous layer can exhibit a desirable shutdown function only if they have a configuration of the present invention. As used herein, the shutdown function is "desirable" when the resistance sufficiently rises within a narrow temperature range. In the measurements of this specification, the shutdown function is deemed desirable when the resistance reaches $10^4$ ohm-cm$^2$ within a temperature range of 5° C. after the resistance starts rising. Although FIG. 2 only represents results for Examples 1-1, 1-2, and Comparative Examples 1-1, 1-2, 1-5, and 1-6, the shutdown characteristics were equally desirable in Examples 1-3 through 1-5 as in Examples 1-1 and 1-2. The shutdown characteristics were also desirable in Comparative Examples 1-7 and 1-8, but not in Comparative Example 1-9.

Table 1 summarizes the results of evaluation, along with various conditions of the separators of Examples 1-1 through 1-5, and Comparative Examples 1-1 through 1-9. It can be seen from Table 1 that separators with desirable shutdown characteristics (SD characteristics), heat shrinkage rate, and slidability can be obtained when the conditions of the present invention are met.

Black, Denki Kagaku Kogyo) powder, and polyvinylidene fluoride (Kureha) in N-methylpyrrolidone at the proportions of 89.5 parts by weight, 4.5 parts by weight, and 6 parts by weight, respectively, in terms of a dry weight. In the cathode paste, the content of the polyvinylidene fluoride was 6 weight %. The resulting paste was applied over an aluminum foil having a thickness of 20 μm, which was then dried and pressed to obtain a cathode.

An anode paste was prepared by dissolving a graphitized mesophase carbon microbead (MCMB, Osaka Gas Chemicals Co., Ltd.; anode active material) powder, acetylene black, and polyvinylidene fluoride in N-methylpyrrolidone at the proportions of 87 parts by weight, 3 parts by weight, and 10 parts by weight, respectively, in terms of a dry weight. In the anode paste, the content of the polyvinylidene fluoride was 6 weight %. The resulting paste was applied over a copper foil having a thickness of 18 μm, which was then dried and pressed to obtain an anode.

The cathode was cut into a 14 mm×20 mm size and tabbed. The anode was cut into a 16 mm×22 mm size and tabbed. The separator, produced in Example 1-1, was cut into a 20 mm×26

TABLE 1

| | Separator, whole | | Polyethylene microporous membrane | | | Heat-resistant porous layer | | |
|---|---|---|---|---|---|---|---|---|
| | Thickness (μm) | Gurley number (sec/100 cc) | Thickness (μm) | Gurley number (sec/100 cc · μm) | Penetration strength (g) | Polymer | Particle diameter of inorganic fine particles (μm) | Content of inorganic fine particles (volume %) |
| Ex. 1-1 | 15 | 447 | 11 | 29.3 | 443 | m-Aramid | 0.8 | 45 |
| Ex. 1-2 | 15 | 435 | 11 | 29.3 | 443 | m-Aramid | 0.8 | 58 |
| Ex. 1-3 | 18 | 380 | 11 | 29.3 | 443 | m-Aramid | 0.8 | 66 |
| Ex. 1-4 | 16 | 364 | 11 | 29.3 | 443 | m-Aramid | 0.8 | 66 |
| Ex. 1-5 | 18 | 936 | 11 | 29.3 | 443 | p-Aramid | 0.8 | 58 |
| Com. Ex. 1-1 | 15 | 453 | 11 | 29.3 | 443 | m-Aramid | 0.8 | 4 |
| Com. Ex. 1-2 | 15 | 452 | 11 | 29.3 | 443 | m-Aramid | 0.8 | 26 |
| Com. Ex. 1-3 | — | — | 11 | 29.3 | 443 | m-Aramid | 0.8 | 87 |
| Com. Ex. 1-4 | — | — | 11 | 29.3 | 443 | m-Aramid | 2.0 | 45 |
| Com. Ex. 1-5 | 15 | 412 | 12 | 21.4 | 300 | m-Aramid | 0.8 | 45 |
| Com. Ex. 1-6 | 15 | 482 | 11 | 29.3 | 443 | m-Aramid | — | — |
| Com. Ex. 1-7 | 16 | 372 | 11 | 29.3 | 443 | m-Aramid | 0.8 | 34 |
| Com. Ex. 1-8 | 17 | 395 | 11 | 29.3 | 443 | m-Aramid | 0.013 | 45 |
| Com. Ex. 1-9 | 18 | 1,568 | 11 | 29.3 | 443 | p-Aramid | 0.8 | 13 |

| | Heat-resistant porous layer | | Heat shrinkage (175° C.) | | | | |
|---|---|---|---|---|---|---|---|
| | Coating thickness (μm) | Coating surface | MD direction (%) | TD direction (%) | Slidability 1 | Slidability 2 (Friction coefficient) | SD characteristics |
| Ex. 1-1 | 4 | Double | 22 | 19 | Desirable | 0.52 | Desirable |
| Ex. 1-2 | 4 | Double | 21 | 18 | Desirable | 0.49 | Desirable |
| Ex. 1-3 | 7 | Double | 11 | 10 | Desirable | 0.45 | Desirable |
| Ex. 1-4 | 5 | Single | 19 | 18 | Desirable | 0.44 | Desirable |
| Ex. 1-5 | 7 | Double | 14 | 13 | Desirable | 0.51 | Desirable |
| Com. Ex. 1-1 | 4 | Double | 37 | 23 | Undesirable | 0.95 | Undesirable |
| Com. Ex. 1-2 | 4 | Double | 53 | 36 | Undesirable | 0.75 | Undesirable |
| Com. Ex. 1-3 | — | Double | — | — | — | — | — |
| Com. Ex. 1-4 | — | Double | — | — | — | — | — |
| Com. Ex. 1-5 | 4 | Double | 15 | 10 | Desirable | 0.53 | Undesirable |
| Com. Ex. 1-6 | 4 | Double | 37 | 20 | Undesirable | 0.90 | Undesirable |
| Com. Ex. 1-7 | 5 | Single | 41 | 30 | Desirable | 0.64 | Desirable |
| Com. Ex. 1-8 | 6 | Double | 21 | 15 | Undesirable | 0.88 | Desirable |
| Com. Ex. 1-9 | 7 | Double | 48 | 25 | Undesirable | 0.86 | Undesirable |

Example 1-6

A cathode paste was prepared by dissolving a lithium cobalt oxide (LiCoO$_2$, Nippon Chemical Industrial Co., Ltd.; cathode active material) powder, an acetylene black (Denka mm size. The cathode, the separator, and the anode were laminated in this order and bonded together. Then, the separator was sealed in an aluminum laminated film with an electrolyte to obtain a non-aqueous secondary battery of the present invention. As the electrolyte, a 1 M solution of LiPF$_6$ dissolved in a 3:7 weight-ratio mixture of ethylene carbonate and ethylmethyl carbonate was used.

Comparative Example 1-10

A battery for comparison was produced as in Example 1-6, except that a polyethylene microporous membrane having a thickness of 20 μm, a unit weight of 12.9 g/m', a Gurley number of 543 sec/100 cc (27.2 sec/100 cc·μm), and a penetration strength of 556 g was used for the separator.
[Battery Oven Test]
Each battery produced in Example 1-6 and Comparative Example 1-10 was charged to 4.2 V with 0.2 C under constant current and constant voltage. The battery was placed in an oven with a 5-kg weight, and the oven was heated to 200° C. Here, temperature-dependent changes on battery voltage were measured. In the battery of Example 1-6, no abrupt voltage drop was observed until 200° C., suggesting that the internal shorting due to the meltdown of the separator was prevented. In contrast, in the battery of Comparative Example 1-10, an abrupt voltage drop occurred as a result of internal shoring at temperatures near 145° C. These results demonstrate that the non-aqueous secondary battery of a configuration of the present invention can avoid the risk associated with the internal shorting also in a high-temperature environment.

Example 1-7

A non-aqueous secondary battery of the present invention was produced as in Example 1-6, except that the separator produced in Example 1-3 was used.

Example 1-8

A non-aqueous secondary battery of the present invention was produced as in Example 1-6, except that the separator produced in Example 1-4 was used. The heat-resistant porous layer formed of Conex and alumina was disposed on the anode side.

Example 1-9

A non-aqueous secondary battery of the present invention was produced as in Example 1-6, except that the separator produced in Example 1-4 was used. The heat-resistant porous layer formed of Conex and alumina was disposed on the cathode side.
[Trickle Charge Test]
A trickle charge test was performed using the batteries of the present invention produced in Examples 1-7, 1-8, and 1-9, and the comparative battery produced in Comparative Example 1-10. The trickle charge test was conducted over a time course of 400 hours, by continuously charging the battery to maintain a battery voltage of 4.3 V in a temperature environment of 60° C.
In the battery of Comparative Example 1-10, a leak current started to flow after 50 hours, making it difficult to maintain the battery voltage at 4.3 V. The battery was disassembled after the test to observe the separator. The separator had carbonized areas, appearing black, over its entire surface.
In the batteries of the present invention produced in Examples 1-7, 1-8, and 1-9, no prominent leak current was observed in the test, and a voltage of 4.3 V was maintained. The small residual current, required to maintain the voltage of 4.3 V, was the smallest in Example 1-7, and became larger in Examples 1-9 and 1-8, in this order. The battery was disassembled after the test to observe the separator. In the separator of Example 1-7, hardly any discoloration or other changes were observed, whereas, in Examples 1-9 and 1-8, discoloration was observed on the surface not coated with the heat-resistant porous layer. The separator of Example 1-9 was dark brown in color, and the separator of Example 1-8 appeared black by discoloration.

It can be seen from these results that coating the polyethylene microporous membrane with the porous layer of wholly aromatic polyamide and inorganic fine particles is also effective from the standpoint of improving durability. Specifically, the polyethylene microporous membrane at the cathode-anode interface degrades under severe conditions, and generates a current leak. In this regard, the heat-resistant porous layer of wholly aromatic polyamide and inorganic fine particles is highly stable, and the provision of the heat-resistant porous layer prevents a current leak even under conditions where the polyethylene microporous membrane would otherwise degrades. Note, however, that degradation does occur on the exposed surface of the polyethylene microporous membrane in a single-coated separator. It is therefore preferable, from the stand point of durability, to form a double-sided coating. Further, concerning durability, it is more preferable to dispose the heat-resistant porous layer on the cathode side in a single-coated separator.

Example 1-10

A non-aqueous secondary battery of the present invention was produced as in Example 1-6, except that the separator of Example 1-5 was used.
The non-aqueous secondary battery was subjected to the trickle charge test as above. In this non-aqueous secondary battery, no leak current was observed, and the voltage was maintained at 4.3 V. However, the small residual current for maintaining the 4.3 V voltage was larger than in the battery of Example 1-7. The separator, observed by disassembling the battery after the trickle charge test, appeared brown by discoloration. The result therefore shows that the para-type wholly aromatic polyamide is not deficient in terms of durability, but is not as preferable as the meta-type wholly aromatic polyamide.

Examples According to the Second Aspect of the Present Invention

Examples according to the second aspect of the present invention are described below.
Measurement Methods
In the Examples according to the second aspect of the present invention, the measurements of Gurley number, thickness, heat shrinkage rate, and penetration strength were performed as in the first aspect of the present invention, and no further explanation will be made regarding the measurement methods.
[Coating Amount]
The coating amount of meta-type wholly aromatic polyamide was determined by subtracting the unit weight of the polyethylene microporous membrane from the unit weight of the separator produced. The unit weight was determined by measuring the weight of a sample piece cut into a 33 cm (MD direction)×6 cm (TD direction) size, and converting this weight into a weight per 1 m² area.
[Porosity]
The bulk density dl of the meta-type wholly aromatic polyamide porous layer was determined from the thickness of this layer and the coating amount. The porosity ε was determined from the following equation:

$$\epsilon = (1 - d1/d2) \times 100,$$

where d2 is the true density of the meta-type wholly aromatic polyamide.

Reference Example 1

A polyethylene microporous membrane was used that had a unit weight of 6.99 g/m$^2$, a thickness of 11 μm, a Gurley number of 322 seconds (29.3 sec/100 cc·μm), heat shrinkage rates of 5.0% and 3.5% in MD direction and TD direction, respectively, at 105° C., and a penetration strength of 443 g. The polyethylene microporous membrane had a weight average molecular weight of 1,270,000.

As the meta-type wholly aromatic polyamide, the poly-m-phenyleneisophthalamide Conex® (Teijin Techno Products Limited) was used. The Conex was dissolved in a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. The polyethylene microporous membrane was immersed in a solidifying liquid at 40° C. (water:mixed solvent=50:50, weight ratio), followed by water washing and drying. As a result, a Conex porous layer was formed on the both surfaces of the polyethylene microporous membrane. Here, the clearance between the two Meyer bars, and the size of the Meyer bars were adjusted to vary the coating amount. The heat shrinkage rate of each sample was measured at 175° C. The result of measurement is represented in the graph of FIG. 3, in which the horizontal axis represents coating amount (unit amount), and the vertical axis represents heat shrinkage rate.

Reference Example 2

Samples with varying coating amounts were produced as in Reference Example 1, except that the weight ratio of DMAc and TPG in the mixed solvent was 70:30. The heat shrinkage rate of each sample was measured at 175° C. The result of measurement is represented in the graph of FIG. 3, in which the horizontal axis represents coating amount, and the vertical axis represents heat shrinkage rate.

Figure 3:
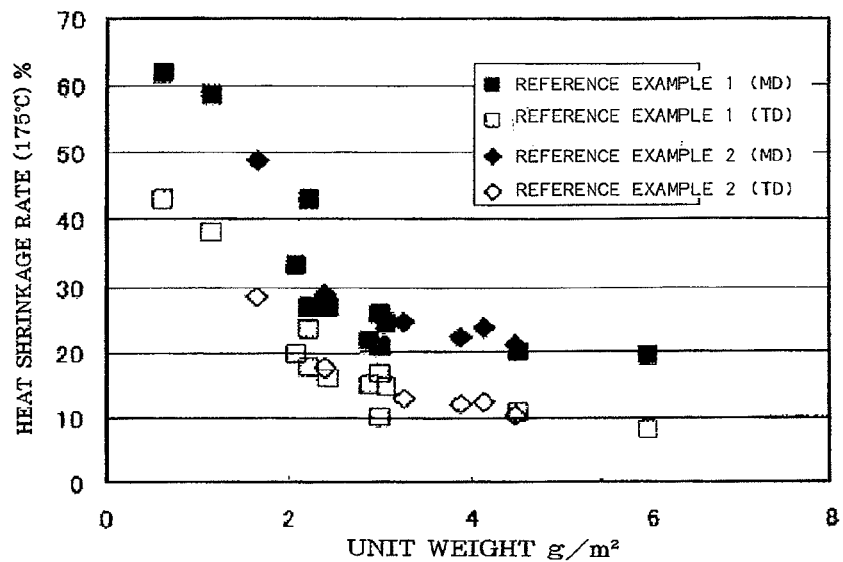
FIG. 3 is a graph concerning an example according to the second aspect of the present invention, representing a relationship between the coating amount of and the heat shrinkage rate of a separator.

It can be seen from FIG. 3 that the heat shrinkage rate abruptly decreases with increase in coating amount, and substantially levels off with the coating amounts of 2 g/m$^2$ and higher.

Example 2-1

A polyethylene microporous membrane was used that had a unit weight of 6.99 g/m$^2$, a thickness of 11 μm, Gurley number of 322 seconds (29.3 sec/100 cc·μm), heat shrinkage rates of 5.0% and 3.5% in MD direction and TD direction, respectively, at 105° C., and a penetration strength of 443 g. The polyethylene microporous membrane had a weight average molecular weight of 1,270,000.

As the meta-type wholly aromatic polyamide, the poly-m-phenyleneisophthalamide Conex® (Teijin Techno Products Limited) was used. The Conex was dissolved in a 60:40 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. The clearance between the Meyer bars was adjusted to 30 μm, and the both Meyer bars were of size 8. The polyethylene microporous membrane was immersed in a solidifying liquid at 40° C. (water:mixed solvent=50:50, weight ratio), followed by water washing and drying. As a result, a Conex porous layer was formed on the both surfaces of the polyethylene microporous membrane. Table 2 represents properties of the separator for a non-aqueous secondary battery according to Example 2-1.

Example 2-2

A separator for a non-aqueous secondary battery of the present invention was obtained as in Example 1, except that the solidifying liquid used for solidification had a temperature of 60° C., and a water:mixed solvent weight ratio of 80:20. Table 2 represents properties of the separator for a non-aqueous secondary battery according to Example 2-2.

Comparative Example 2-1

A polyethylene microporous membrane was used that had a unit weight of 6.99 g/m$^2$, a thickness of 11 μm, Gurley number of 322 seconds (29.3 sec/100 cc·μm), heat shrinkage rates of 5.0% and 3.5% in MD direction and TD direction, respectively, at 105° C., and a penetration strength of 443 g. The polyethylene microporous membrane had a weight average molecular weight of 1,270,000.

As the meta-type wholly aromatic polyamide, the poly-m-phenyleneisophthalamide Conex® (Teijin Techno Products Limited) was used. The Conex was dissolved in a 70:30 weight-ratio mixed solvent of dimethylacetoamide (DMAc) and tripropyleneglycol (TPG) so as to make the Conex content 6 weight %. The resultant mixture was obtained as the coating liquid.

Two Meyer bars were disposed opposite to each other, and an appropriate amount of the coating liquid was placed therebetween. The polyethylene microporous membrane was passed between the Meyer bars holding the coating liquid, so as to apply the coating liquid on the both surfaces of the polyethylene microporous membrane. The clearance between the Meyer bars was adjusted to 30 and the both Meyer bars were of size 8. The polyethylene microporous membrane was immersed in a solidifying liquid at 40° C. (water:mixed solvent=50:50, weight ratio), followed by water washing and drying. As a result, a Conex porous layer was formed on the both surfaces of the polyethylene microporous membrane. Table 2 represents properties of the separator for a non-aqueous secondary battery according to Comparative Example 2-1.

Comparative Example 2-2

A separator for comparison was obtained as in Comparative Example 1, except that the solidifying liquid used for solidification had a temperature of 40° C., and a water:mixed solvent weight ratio of 80:20. Table 2 represents properties of the separator for a non-aqueous secondary battery according to Comparative Example 2-2.

Comparative Example 2-3

A polyethylene microporous membrane was used that had a unit weight of 7.72 g/m$^2$, a thickness of 12 μm, a Gurley number of 257 seconds (21.4 sec/100 cc·μm), heat shrinkage rates of 4.9% and 2.7% in MD direction and TD direction, respectively, at 105° C., and a penetration strength of 300 g. The polyethylene microporous membrane had a weight average molecular weight of 1,070,000.

A meta-type wholly aromatic polyamide porous layer was formed on the polyethylene microporous membrane as in Example 2-1 to obtain a comparative separator. Table 2 represents properties of the separator for a non-aqueous secondary battery according to Comparative Example 2-3.

Comparative Example 2-4

A polyethylene microporous membrane was used that had a unit weight of 7.72 g/m$^2$, a thickness of 12 μm, a Gurley number of 257 seconds (21.4 sec/100 cc·μm), heat shrinkage rates of 4.9% and 2.7% in MD direction and TD direction, respectively, at 105° C., and a penetration strength of 300 g. The polyethylene microporous membrane had a weight average molecular weight of 1,070,000.

A meta-type wholly aromatic polyamide porous layer was formed as in Comparative Example 2-1, except for using the polyethylene microporous membrane above, to obtain a comparative separator. Table 2 represents properties of the separator for a non-aqueous secondary battery according to Comparative Example 2-4.

TABLE 2

| | Polyethylene microporous membrane | | Heat-resistant porous layer | | |
|---|---|---|---|---|---|
| | Thickness (μm) | Gurley number (sec/100 cc · μm) | Coating amount (g/m$^2$) | Coating thickness (μm) | Porosity (%) |
| Ex. 2-1 | 11 | 29.3 | 2.25 | 4 | 58 |
| Ex. 2-2 | 11 | 29.3 | 2.07 | 3 | 49 |
| Com. Ex. 2-1 | 11 | 29.3 | 2.22 | 5 | 67 |
| Com. Ex. 2-2 | 11 | 29.3 | 2.07 | 4 | 61 |
| Com. Ex. 2-3 | 12 | 21.4 | 2.40 | 6 | 70 |
| Com. Ex. 2-4 | 12 | 21.4 | 2.11 | 6 | 73 |

Example 2-3

A cathode paste was prepared by dissolving a lithium cobalt oxide (LiCoO$_2$, Nippon Chemical Industrial Co., Ltd.; cathode active material) powder, an acetylene black (Denka Black, Denki Kagaku Kogyo) powder, and polyvinylidene fluoride (Kureha) in N-methylpyrrolidone at the proportions of 89.5 parts by weight, 4.5 parts by weight, and 6 parts by weight, respectively, in terms of a dry weight. In the cathode paste, the content of the polyvinylidene fluoride was 6 weight %. The resulting paste was applied over an aluminum foil having a thickness of 20 which was then dried and pressed to obtain a cathode.

An anode paste was prepared by dissolving a graphitized mesophase carbon microbead (MCMB, Osaka Gas Chemicals Co., Ltd.; anode active material) powder, acetylene black, and polyvinylidene fluoride in N-methylpyrrolidone at the proportions of 87 parts by weight, 3 parts by weight, and 10 parts by weight, respectively, in terms of a dry weight. In the anode paste, the content of the polyvinylidene fluoride was 6 weight %. The resulting paste was applied over a copper foil having a thickness of 18 μm, which was then dried and pressed to obtain an anode.

The cathode was cut into a 14 mm×20 mm size and tabbed. The anode was cut into a 16 mm×22 mm size and tabbed. The separator, produced in Example 2-1, was cut into a 20 mm×26 mm size. The cathode, the separator, and the anode were laminated in this order and bonded together. Then, the separator was sealed in an aluminum laminated film with an electrolyte to obtain a non-aqueous secondary battery of the present invention. As the electrolyte, a 1 M solution of LiPF$_6$ dissolved in a 3:7 weight-ratio mixture of ethylene carbonate and ethylmethyl carbonate was used.

Comparative Example 2-5

A battery for comparison was produced as in Example 2-3, except that a polyethylene microporous membrane having a thickness of 20 μm, a unit weight of 12.9 g/m$^2$, a Gurley number of 543 sec/100 cc (27.2 sec/100 cc·μm), and a penetration strength of 556 g was used for the separator.

[Battery Oven Test]

Each battery produced in Example 2-3 and Comparative Example 2-5 was charged to 4.2 V with 0.2 C under constant current and constant voltage. The battery was placed in an oven with a 5-kg weight, and the oven was heated to 200° C. Here, temperature-dependent changes on battery voltage were measured. In the battery of Example 2-3, no abrupt voltage drop was observed until 200° C., suggesting that the internal shorting due to the meltdown of the separator was prevented. In contrast, in the battery of Comparative Example 2-5, an abrupt voltage drop occurred as a result of internal shoring at temperatures near 145° C. These results demonstrate that the non-aqueous secondary battery of the configuration of the present invention can avoid the risk associated with the internal shorting also in a high-temperature environment.

[Evaluation of Shutdown Characteristics]

The shutdown characteristics were evaluated in regard to the separators of Examples 2-1 and 2-2, and Comparative Examples 2-1 through 2-4, as in the Examples according to the foregoing first aspect of the present invention.

Figure 4:
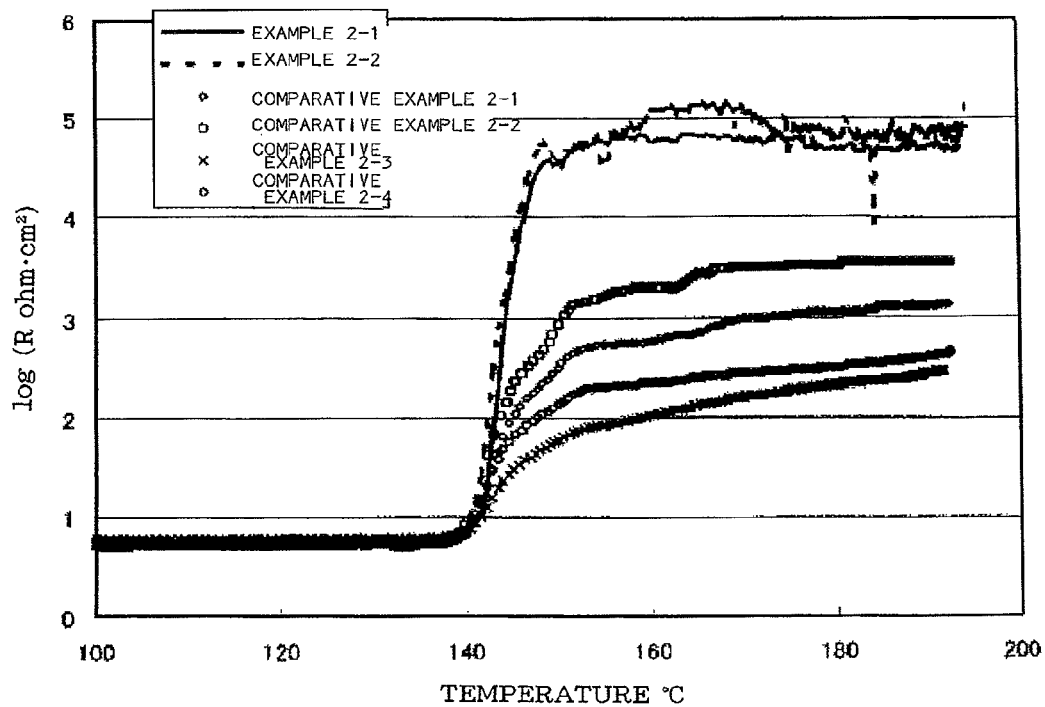
FIG. 4 is a graph concerning an example according to the second aspect of the present invention, representing a result of the evaluation of a shutdown function.

The results are represented in FIG. 4. By comparing the Examples and the Comparative Examples, it can be seen that the separators coated with the heat-resistant porous layer can exhibit a desirable shutdown function only if they have a configuration of the present invention.

INDUSTRIAL APPLICABILITY

A separator of the present invention effectively ensures safety of non-aqueous secondary batteries. The separator is therefore suitable for use in high-energy-density, high-capacity, or high-output non-aqueous secondary batteries.

What is claimed is:

1. A separator for a non-aqueous secondary battery, comprising:
   a microporous membrane of primarily polyethylene; and
   a heat-resistant porous layer of primarily a wholly aromatic polyamide formed on at least one surface of the microporous membrane,
   the separator characterized in that:
   (1) the heat-resistant porous layer contains inorganic fine particles having an average particle diameter of 0.1 to 1.0 μm; and
   (2) the inorganic fine particles are 40% to 80% in volume with respect to a total volume of the wholly aromatic polyamide and the inorganic fine particles.

2. The separator according to claim 1, wherein the heat-resistant porous layer is formed on both surfaces of the microporous membrane.

3. The separator according to claim 1, wherein the wholly aromatic polyamide is a meta-type wholly aromatic polyamide.

4. The separator according to claim 1, wherein the heat-resistant porous layer is formed on both surfaces of the microporous membrane, wherein the microporous membrane is made of polyethylene, and wherein the wholly aromatic polyamide is a meta-type wholly aromatic polyamide.

5. The separator according to claim 3, wherein the meta-type wholly aromatic polyamide is a poly-m-phenyleneisophthalamide.

6. The separator according to claim 1, wherein the microporous membrane has a penetration strength of 250 g or more.

7. The separator according to claim 1, wherein the microporous membrane has a thickness of 7 to 16 μm, and wherein the separator has a thickness of 20 μm or less as a whole.

8. The separator according to claim 1, wherein the heat-resistant porous layer has a total thickness of 3 to 12 μm when formed on both surfaces of the microporous membrane, and a thickness of 3 to 12 μm when formed on only one surface of the microporous membrane.

9. The separator according to claim 1, wherein the inorganic fine particles are made of alumina.

10. A producing process of a separator for a non-aqueous secondary battery of claim 1, the separator including a microporous membrane of primarily polyethylene, and a heat-resistant porous layer of primarily a wholly aromatic polyamide formed on at least one surface of the microporous membrane, the process characterized by comprising the following steps:
(1) applying a coating liquid to at least one surface of the microporous membrane, the coating liquid including a wholly aromatic polyamide, inorganic fine particles, a solvent for dissolving the wholly aromatic polyamide, and a solvent that serves as a poor solvent for the wholly aromatic polyamide;
(2) solidifying the coating liquid by immersing the microporous membrane in a mixture of the solvent for dissolving the wholly aromatic polyamide, and the solvent that serves as a poor solvent for the wholly aromatic polyamide, after applying the coating liquid to the microporous membrane;
(3) performing water washing to remove the solvent mixture; and
(4) performing drying to remove the water,
the inorganic fine particles used in said step (1) having an average particle diameter of 0.1 to 1.0 μm, and being contained in an amount of 40 to 80 volume % with respect to a total volume of the wholly aromatic polyamide and the inorganic fine particles.

11. A non-aqueous secondary battery using a separator of claim 1.

12. The separator according to claim 2, wherein the wholly aromatic polyamide is a meta-type wholly aromatic polyamide.

13. The separator according to claim 4, wherein the meta-type wholly aromatic polyamide is a poly-m-phenyleneisophthalamide.

14. The separator according to claim 12, wherein the meta-type wholly aromatic polyamide is a poly-m-phenyleneisophthalamide.

15. The separator according to claim 1, wherein the inorganic fine particles are 45% to 80% in volume with respect to a total volume of the heat-resistant polymer and the inorganic fine particles.

* * * * *